(12) United States Patent
Hanhart et al.

(10) Patent No.: US 12,003,770 B2
(45) Date of Patent: Jun. 4, 2024

(54) FACE DISCONTINUITY FILTERING FOR 360-DEGREE VIDEO CODING

(71) Applicant: VID SCALE, INC., Wilmington, DE (US)

(72) Inventors: Philippe Hanhart, La Conversion (CH); Yan Ye, San Diego, CA (US); Yuwen He, San Diego, CA (US)

(73) Assignee: VID Scale, Inc., Wilmington, DE (US)

( * ) Notice: Subject to any disclaimer, the term of this patent is extended or adjusted under 35 U.S.C. 154(b) by 0 days.

(21) Appl. No.: 17/884,399

(22) Filed: Aug. 9, 2022

(65) Prior Publication Data
US 2022/0385942 A1 Dec. 1, 2022

Related U.S. Application Data

(63) Continuation of application No. 16/955,190, filed as application No. PCT/US2018/066233 on Dec. 18, 2018, now Pat. No. 11,432,010.

(60) Provisional application No. 62/651,448, filed on Apr. 2, 2018, provisional application No. 62/607,737, filed on Dec. 19, 2017.

(51) Int. Cl.
| | |
|---|---|
| *H04N 19/597* | (2014.01) |
| *H04N 19/117* | (2014.01) |
| *H04N 19/85* | (2014.01) |

(52) U.S. Cl.
CPC ......... *H04N 19/597* (2014.11); *H04N 19/117* (2014.11); *H04N 19/85* (2014.11)

(58) Field of Classification Search
USPC .................................................. 375/240.12
See application file for complete search history.

(56) References Cited

U.S. PATENT DOCUMENTS

| | | | |
|---|---|---|---|
| 10,218,971 B2 | 2/2019 | Dong et al. | |
| 10,972,728 B2 | 4/2021 | He et al. | |
| 2011/0026597 A1 | 2/2011 | Tanaka et al. | |
| 2015/0365666 A1 | 12/2015 | Dong et al. | |
| 2017/0085917 A1 | 3/2017 | Hannuksela | |

(Continued)

FOREIGN PATENT DOCUMENTS

| | | |
|---|---|---|
| CN | 104685877 A | 6/2015 |
| EP | 2 230 855 A3 | 9/2013 |

(Continued)

OTHER PUBLICATIONS

360LIB, Available at <https://jvet.hhi.fraunhofer.de/svn/svn_360Lib/>, 1 page.

(Continued)

*Primary Examiner* — Stuart D Bennett
(74) *Attorney, Agent, or Firm* — Condo Roccia Koptiw LLP

(57) ABSTRACT

Systems, methods, and instrumentalities are disclosed for discontinuous face boundary filtering for 360-degree video coding. A face discontinuity may be filtered (e.g., to reduce seam artifacts) in whole or in part, for example, using coded samples or padded samples on either side of the face discontinuity. Filtering may be applied, for example, as an in-loop filter or a post-processing step. 2D positional information related to two sides of the face discontinuity may be signaled in a video bitstream so that filtering may be applied independent of projection formats and/or frame packing techniques.

16 Claims, 24 Drawing Sheets

(56) References Cited

U.S. PATENT DOCUMENTS

| | | | |
|---|---|---|---|
| 2017/0366808 A1 | 12/2017 | Lin et al. | |
| 2018/0020202 A1* | 1/2018 | Xu | H04N 19/86 |
| 2018/0054632 A1* | 2/2018 | Nakagawa | H04N 19/82 |
| 2019/0373287 A1* | 12/2019 | Lim | H04N 19/105 |
| 2020/0234399 A1* | 7/2020 | Lin | G06T 19/20 |

FOREIGN PATENT DOCUMENTS

| | | |
|---|---|---|
| TW | 201642653 A | 12/2016 |
| WO | 2017/158236 A2 | 9/2017 |
| WO | 2017/205648 A1 | 11/2017 |
| WO | 2018/156281 A1 | 8/2018 |

OTHER PUBLICATIONS

Abbas et al., "AHG8: New GoPro Test Sequences for Virtual Reality Video Coding", JVET-D0026, GoPro, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

Abbas et al., "AHG8: New Test Sequences for Spherical Video Coding from GoPro", JVET-G0147, GoPro, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.

Asbun et al., "AHG8: InterDigital Test Sequences for Virtual Reality Video Coding", JVET-D0039, InterDigital Communications, Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, 4 pages.

Asbun et al., "InterDigital Test Sequences for Virtual Reality Video Coding", JVET-G0055, InterDigital Communications, Inc., Joint Video Exploration Team (JVET) of ITU-T SG 16 WP 3 and ISO/IEC JTC 1/SC 29/WG 11, 7th Meeting: Torino, IT, Jul. 13-21, 2017, 4 pages.

Baroncini et al., "Results of the Joint Call for Evidence on Video Compression with Capability beyond HEVC", JVET-G1004-V2, JVET, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-17.

Boyce et al., "EE4: Padded ERP (PERP) Projection Format", JVET-G0098, Intel Corp., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-10.

Boyce et al., "JVET Common Test Conditions and Evaluation Procedures for 360° Video", JVET-F1030-V4, Editors, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-7.

Choi, Byeongdoo, "Technologies Under Consideration for Omnidirectional Media Application Format", Systems Subgroup, ISO/IEC JTC1/SC29/WG11 N15946, San Diego, CA, US, Feb. 2016, 16 pages.

Coban et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.

Facebook360, "Facebook 360 Video", Available at <https://facebook360.fb.com/>, pp. 1-5.

Github, "Facebook's Equirectangular to Cube Map Tool on GitHub", Transform 360, Available at <https://github.com/facebook/transform?files=1>, pp. 1-3.

Google, "Bringing Pixels Front and Center in VR Video", Available at <https://www.blog.google/products/google-vr/bringing-pixels-front-and-center-vr-video/>, Mar. 14, 2017, pp. 1-8.

Google VR, "Google Cardboard", Available at <https://www.google.com/get/cardboard/>, pp. 1-4.

Hanhart et al., "AHG8: High Level Syntax Extensions for Signaling of 360-Degree Video Information", JVET-D0093, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

He et al., "Motion Compensated Prediction with Geometry Padding for 360 Video Coding", IEEE Visual Communications and Image Processing (VCIP), St. Petersburg, USA, Dec. 10-13, 2017, 4 pages.

HTC, "HTC Vive", Available at <https://www.htcvive.com/us/>, pp. 1-3.

ISO/IEC, "Requirements for OMAF", Requirements, ISO/IEC JTC1/SC29/WG11 N16143, San Diego, CA, US, Feb. 2016, 2 pages.

Kuzyakov et al., "Next-Generation Video Encoding Techniques for 360 Video and VR", Facebook Code, Available at <https://code.facebook.com/posts/1126354007399553/next-generation-video-encoding-techniques-for-360-video-and-vr/>, Jan. 21, 2016, pp. 1-6.

Lin et al., "Description of 360° Video Coding Technology Proposal by MediaTek", JVET-J0019-V1, MediaTek Inc., Joint Video Experts Team (JVET) of ITU-T SG 16 WP 3 and ISO/IEC JTC 1/SC 29/WG 11, 10th Meeting: San Diego, US, Apr. 10-20, 2018, 27 pages.

Norkin et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.

Oculus, "Oculus Rift", Available at <https://www.oculus.com/en-us/rift/>, pp. 1-19.

Schwarz et al., "Tampere Pole Vaulting Sequence for Virtual Reality Video Coding", JVET-D0143, Nokia, Tampere University of Technology, Rakka Creative, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-2.

Segall et al., "Draft Joint Call for Proposals on Video Compression with Capability beyond Hevc", JVET-G1002, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 28 pages.

Sullivan et al., "Meeting Notes of the 3rd Meeting of the Joint Video Exploration Team (JVET), Geneva, CH, May 26-Jun. 1, 2016", JVET-C1000, Responsible Coordinators, Joint Video Exploration Team (JVET) of ITU-T SG 16 WP 3 and ISO/IEC Jtc 1/SC 29/WG 11, 3rd Meeting: Geneva, Jun. 2016, pp. 1-73.

Sun et al., "Test Sequences for Virtual Reality Video Coding from LetinVR", JVET-G0053, Letin VR Digital Technology Co., Ltd., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.

Sun et al., "Test Sequences for Virtual Reality Video Coding from LetinVR", JVET-D0179, Letin VR Digital Technology Co., Ltd., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.

Thomas et al., "5G and Future Media Consumption", TNO, ISO/IEC JTC1/SC29/WG11 MPEG2016/m37604, San Diego, CA, US, Feb. 2016, 10 pages.

Wien et al., "Joint Call for Evidence on Video Compression with Capability Beyond HEVC", JVET-F1002, JVET, Joint Video Exploration Team (JVET) of ITU-T SG 16 WP 3 and ISO/IEC JTC 1/SC 29/WG 11, Hobart, AU, Mar. 31-Apr. 7, 2017, pp. 1-11.

Xiu et al., "Description of SDR, HDR and 360° Video Coding Technology Proposal by InterDigital Communications and Dolby Laboratories", JVET-J0015-V1, InterDigital Communications, Inc., Dolby Laboratories, Inc., Joint Video Experts Team (JVET) of ITU-T SG 16 WP 3 and ISO/IEC JTC1/SC 29/WG 11, 10th Meeting: San Diego, US, Apr. 10-20, 2018, 82 pages.

Ye et al., "Algorithm Descriptions of Projection Format Conversion and Video Quality Metrics in 360Lib", JVET-F1003-V1, Editors, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-33.

Youtube, "360 Video", Virtual Reality, Available at <https://www.youtube.com/channel/UCzuqhhs6NWbgTzMuM09WKDQ>, pp. 1-3.

* cited by examiner

FIG. 8

FACE DISCONTINUITY FILTERING FOR 360-DEGREE VIDEO CODING

CROSS-REFERENCE TO RELATED APPLICATIONS

This application is a continuation application of U.S. Non-Provisional application Ser. No. 16/955,190, filed Jun. 18, 2020, which is the National Stage Entry under 35 U.S.C. § 371 of Patent Cooperation Treaty Application No. PCT/US2018/066233, filed Dec. 18, 2018, which claims the benefit of U.S. Provisional Patent Application No. 62/607,737, filed on Dec. 19, 2017, and U.S. Provisional Patent Application No. 62/651,448, filed on Apr. 2, 2018, the disclosures of which are incorporated herein by reference in their entireties.

BACKGROUND

A variety of digital video compression technologies enable efficient digital video communication, distribution and consumption. Some examples of standardized video compression technologies are H.261, MPEG-1, MPEG-2, H.263, MPEG-4 part 2 and H.264/MPEG-4 part 10 AVC. Advanced video compression technologies, such as High Efficiency Video Coding (HEVC), may provide twice the compression or half the bit rate at the same video quality compared to H.264/AVC. Various techniques may be used to reduce seam artifacts.

SUMMARY

Systems, methods, and instrumentalities are disclosed for filtering a face discontinuity associated with a 360-degree video. A frame-packed picture representative of the 360-degree video may be received by a coding device (e.g., an encoding device and/or a decoding device). The frame-packed picture may include one or more faces corresponding to respective two-dimensional (2D) projections of the 360-degree video. The coding device may determine whether a face discontinuity (e.g. at least one face discontinuity) exists in the frame-packed picture. If such a face discontinuity exists, the coding device may further identify a first side and a second side of the face discontinuity based on 2D positional information associated with the face discontinuity. Such 2D positional information may be included in the video bitstream, and the first and second sides of the face discontinuity may respectively coincide with a first edge of a first face and a second edge of a second face. The coding device may apply a filter to one or more samples located along the first and second edges based on the identified first and second sides, e.g., to remove one or more artifacts associated with the face discontinuity. If no face discontinuity exists in the frame-packed picture, the coding device may process samples located along an edge of the plurality of faces without applying a filter.

The 2D positional information associated with the face discontinuity may indicate the position of a first starting point of the first side of the face discontinuity and the position of a second starting point of the second side of the face discontinuity. The 2D positional information may further indicate a relative position (e.g., a distance) of the first starting point to a first endpoint of the first side of the face discontinuity, as well as a relative position (e.g., a distance) of the second starting point to a second endpoint the second side of the face discontinuity. The filtering may be applied as a post-processing step or using an in-loop filter. The filtering may be applied jointly to coded samples in the first and second faces along the first and second edges. Alternatively or additionally, the first face may be padded (e.g. using geometry padding) and filtering may be applied to at least one sample along the first edge using one or more padded samples of the first face.

BRIEF DESCRIPTION OF THE DRAWINGS

FIG. 8 is a diagram illustrating example reference samples that may be used in intra prediction of a current transform unit (TU).

DETAILED DESCRIPTION

Figure 1A:
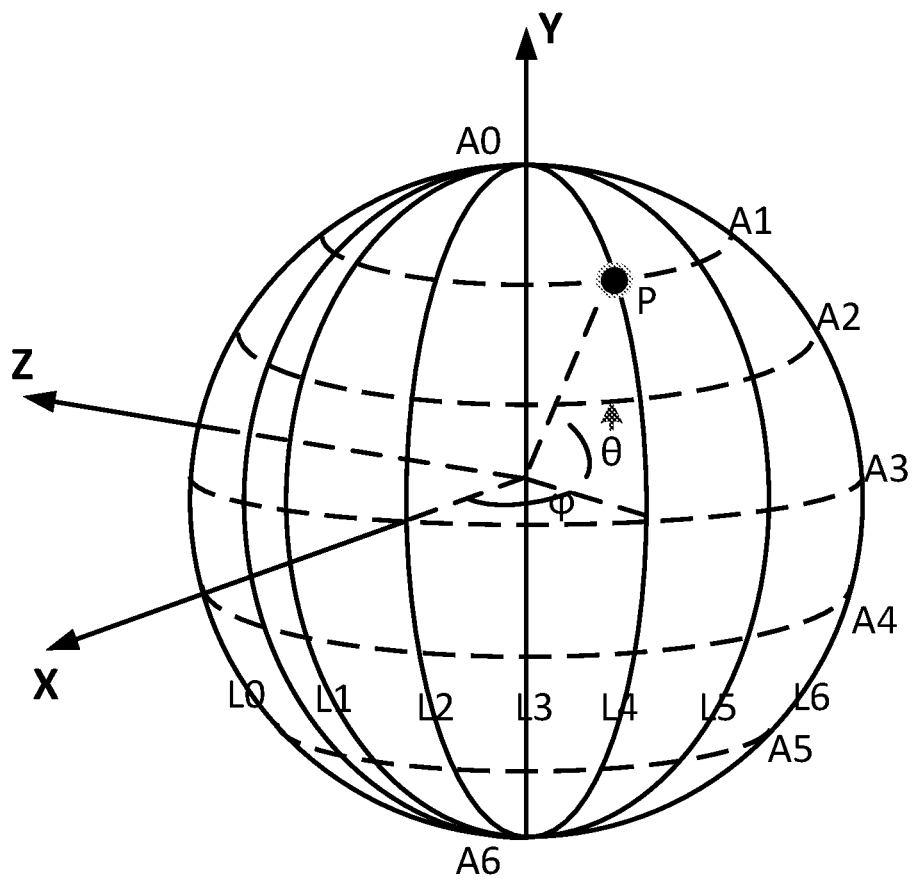
FIG. 1A is a diagram illustrating an example of sphere sampling in longitudes ($\varphi$) and latitudes ($\theta$).

Virtual reality (VR) may have many application areas, e.g., healthcare, education, social networking, industry design/training, games, movies, shopping, entertainment, etc. VR may provide an immersive viewing experience, e.g., for industries and consumers. VR may create a virtual environment surrounding a viewer and may generate a sense of real experience for a viewer. User experience may, for example, depend on whether a VR environment provides a full realistic feeling. A VR system may support interactions, for example, through posture, gesture, eye gaze, voice, etc. A VR system may provide haptics feedback to a user, for example, to allow the user to interact with objects in a VR world in a natural way. A VR system may use 360-degree videos to provide users with a capability to view a scene from 360-degree angles (e.g. in a horizontal direction) and/or 180-degree angles (e.g. in a vertical direction). Future media consumption may evolve around VR and 360-degree videos.

VR quality and user experience of various aspects of a VR processing chain (e.g. capturing, processing, display and applications) may be improved. A VR system may (e.g. for capturing) use multiple cameras to capture a scene from different and/or divergent views (e.g. 6-12 views). These views may be stitched together to form a 360-degree video in high resolution (e.g. 4K or 8K). A VR system (e.g. on a client or user side) may include a computation platform, a head mounted display (HMD), head tracking sensors, etc. A computation platform may be responsible for receiving and decoding 360-degree video and/or generating a viewport for display. Two pictures, one for each eye, may be rendered for a viewport. Two pictures may be displayed in an HMD, e.g., for stereo viewing. A lens may be used to magnify an image displayed in a HMD, e.g., for better viewing. A head tracking sensor may (e.g. constantly) keep track of a viewer's head orientation. The orientation information may be used to display a viewport picture for a specific orientation. A VR system may provide a touch device (e.g. a specialized touch device) for a viewer to interact with objects in a virtual world.

A VR system may be driven, for example, by a workstation with graphics processing unit (GPU) support. A VR system (e.g. a light VR system) may use a smartphone to serve as a computation platform, an HMD display and/or a head tracking sensor. A VR system may include a spatial HMD resolution of approximately 2160×1200, a refresh rate of approximately 90 Hz, and/or a field of view (FOV) of approximately 110 degrees. A sampling rate for a head tracking sensor may be, for example, 1000 Hz, which may capture very fast movement. A VR system may comprise a lens and/or a cardboard, either or both of which may be driven by a smartphone. A VR system may be used for gaming, and/or to provide 360-degree video streaming services.

A processing chain for client interoperability and/or an omnidirectional media application format may be standardized. 360-degree 3D video applications may be implemented, e.g., in a 360-degree video (e.g. omnidirectional video) based system or in a multi-view based system. Compression may vary in accordance with the projection and/or conversion techniques employed. 360-degree video coding compression may be implemented, for example, in a standard dynamic range category, a high dynamic range category, and/or a 360-degree video category.

A 360-degree video compression and delivery system may include one or more channels for DASH based 360-degree video streaming. 360-degree video delivery may utilize a sphere geometry structure to represent 360-degree information. In examples, synchronized multiple views (e.g. captured by multiple cameras) may be stitched on a sphere as an integral structure, Spherical information may be projected to a 2D planar surface. For example, spherical information may be projected using geometry conversion techniques. The projection formats for 360-degree videos may include equirectangular projection and cubemap projection.

Figure 1B:
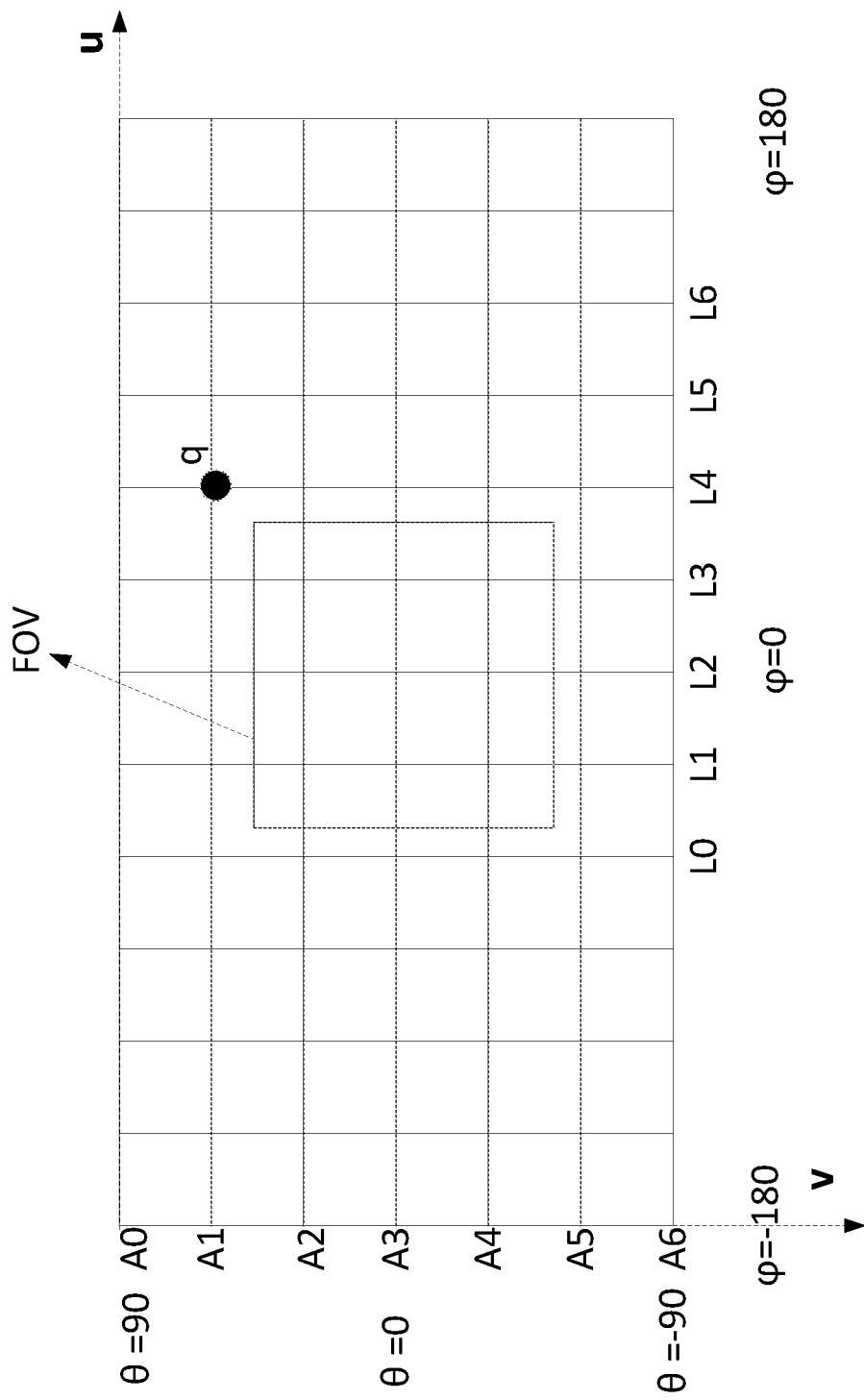
FIG. 1B is a diagram illustrating a sphere being projected onto a 2D plane using equirectangular projection (ERP).

FIGS. 1A and 1B show examples of sphere geometry projection onto a 2D plane using equirectangular projection. FIG. 1A shows an example of sphere sampling in longitudes ($\varphi$) and latitudes ($\theta$). FIG. 1B shows an example of a sphere being projected onto a 2D plane using equirectangular projection (ERP). A point P on the sphere may be projected to point q in a 2D plane. A longitude $\varphi$ in the range $[-\pi, \pi]$ may be referred to as yaw (e.g. as in aviation) while a latitude $\theta$ in the range $[-\pi/2, \pi/2]$ may be referred to as pitch, where r may be a ratio of a circle's circumference to its diameter. In examples, (x, y, z) may represent a point's coordinates in 3D space while (ue, ve) may represent a point's coordinates in a 2D plane when ERP is used. ERP may be represented mathematically, for example, in accordance with Equations (1) and (2):

$$ue=(\varphi/(2*\pi)+0.5)*W \quad (1)$$

$$ve=(0.5-\theta/\pi)*H \quad (2)$$

where W and H may be the width and height of a 2D planar picture. A point P (e.g. a cross point between longitude L4 and latitude A1 on a sphere) may be mapped to a unique point q in a 2D plane, for example, using Equations (1) and (2). A point q in a 2D plane may be projected back to a point P on a sphere, e.g., via inverse projection. In examples (e.g. such as that shown in FIG. 1B), a field of view in a sphere may be mapped to a 2D plane with a view angle along an X axis of approximately 110 degrees.

A 360-degree video may be mapped (e.g. using ERP) to a normal 2D video. It may be encoded, for example, using a video codec (e.g. a codec based on H.264, HEVC, and/or the like). The encoded 360-degree video may be delivered to a client. An equirectangular video may be decoded by a client and may be rendered, for example, based on a user's viewport, e.g., by projecting and displaying the portion belonging to an FOV in the equirectangular picture onto an HMD. A spherical video may be transformed to a 2D planar picture, e.g., for encoding with ERP. Characteristics of an equirectangular 2D picture may be different from those of a conventional 2D picture (e.g. a rectilinear video).

A top portion of an equirectangular picture may correspond to a north pole, a bottom portion of the picture may correspond to a south pole and a middle portion of the picture may correspond to an Equator. The top and bottom portions may be stretched compared to the middle portion, which may indicate that equirectangular sampling in a 2D spatial domain may be uneven. A motion field in a 2D equirectangular picture among a temporal direction may be more complicated than a motion in a normal 2D video.

Left and right boundaries of an ERP picture may be coded independently. Independent coding of left and right boundaries of an ERP picture may create objectionable visual artifacts. For example, such visual artifacts may appear in the form of "face seams" when a corresponding reconstructed video is used to render a viewport displayed to a user (e.g. via an HMD or a conventional 2D screen). Seam artifacts (e.g. in reconstructed viewports that encompass left and right boundaries of an ERP picture) may be reduced, for example, by padding N (e.g. 8) luma samples on the left and right sides of the picture (e.g. using geometry padding). A padded ERP picture containing padding samples may be encoded. A reconstructed ERP with padding may (e.g. after decoding) be converted back, for example, by blending duplicated samples or cropping padded areas.

The top and bottom portions of an ERP picture, which may correspond to a north pole and a south pole respectively, may be stretched compared to the middle portion of the picture. This may indicate that spherical sampling density may be uneven for ERP format. A motion field that describes a temporal correlation among neighboring ERP pictures may become more complicated than conventional 2D video. A video codec may use a translational model to describe a motion field, which may not efficiently represent shape varying movement in planar ERP pictures. A variety of geometric projection formats may be used to map a 360-degree video onto multiple faces (e.g. each of these faces may map to a respective projection of the 360-degree video onto a 2D plane). Cubemap projection (CMP) may be a compression friendly projection format.

Figure 2A:
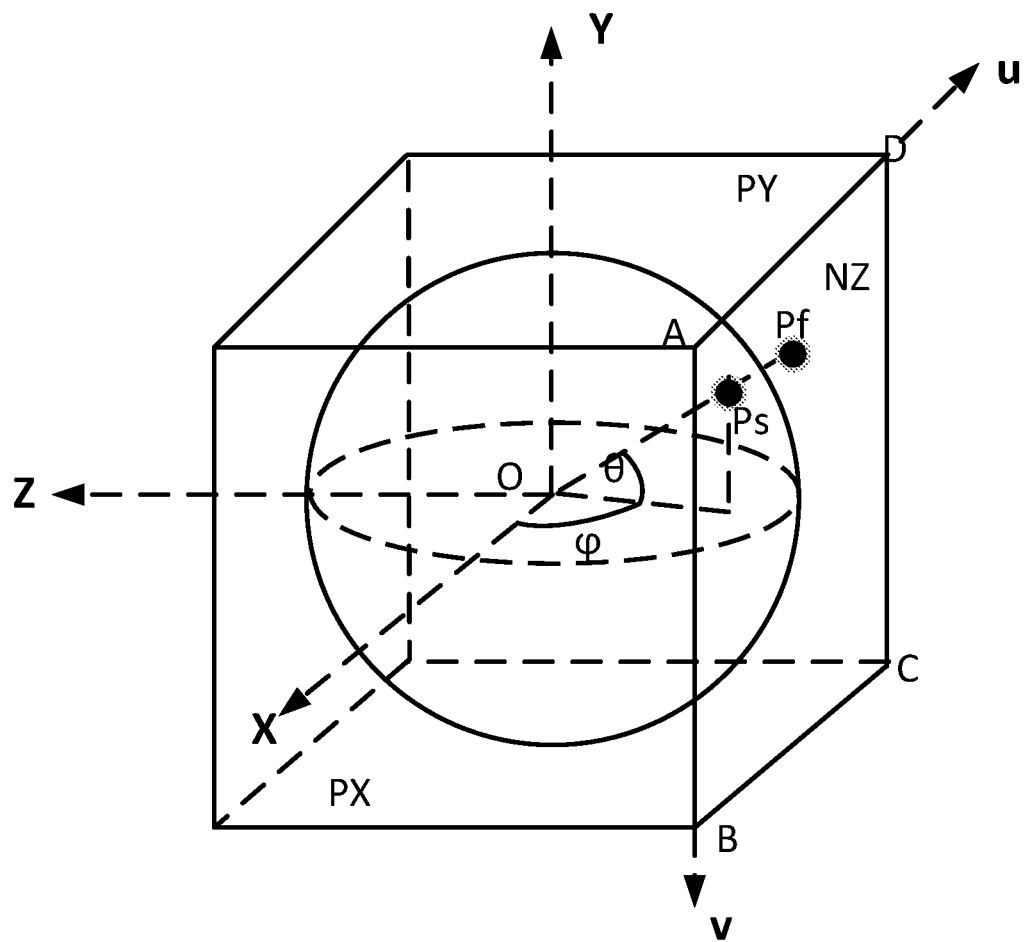
FIG. 2A is a diagram illustrating an example of cubemap projection (CMP) geometry.

FIG. 2A shows an example of CMP geometry. A CMP 3D geometry structure may include six square faces, which may be labeled as PX, PY, PZ, NX, NY, NZ. P may indicate positive, N may indicate negative and X, Y, Z may refer to three axes in a 3D space. The faces may be labeled using numbers 0-5, e.g., PX (0), NX (1), PY (2), NY (3), PZ (4), NZ (5). In examples, a radius of a tangent sphere may be assumed to be 1 and the lateral length of a projection face may be assumed to be 2. The six faces of the CMP format may be packed together (e.g. via frame-packing) into a single picture, for example, such that it may be encoded/decoded using a video codec not designed to directly handle sphere video. One or more faces of CMP may be rotated (e.g. by a certain degree), for example, to maximize continuity between neighboring faces.

Figure 2B:
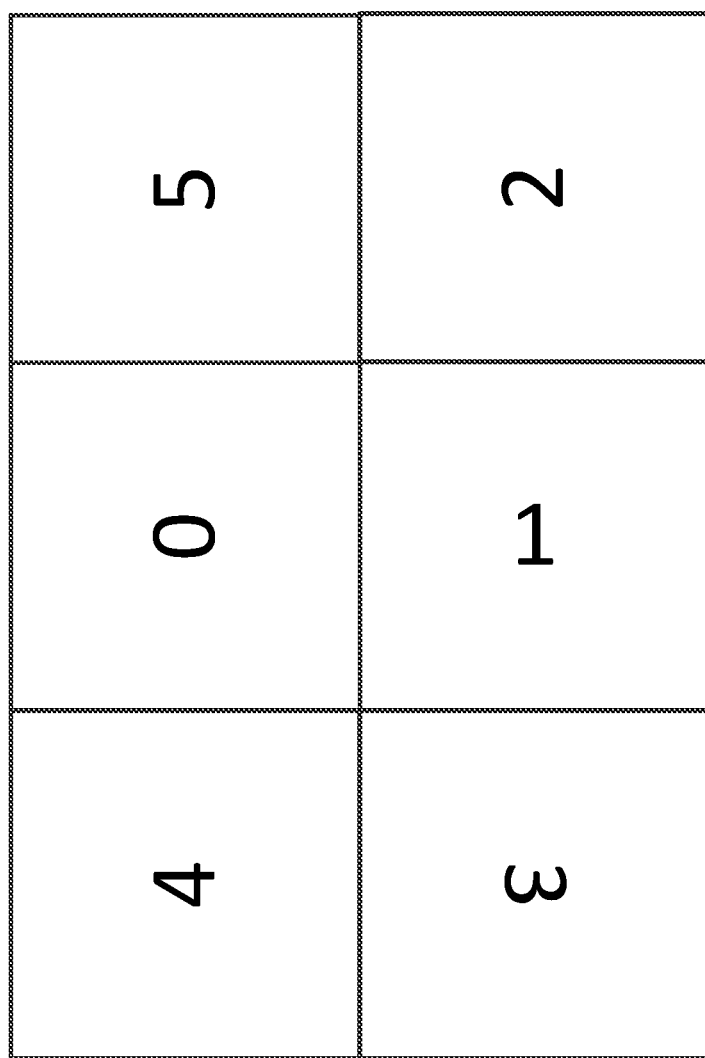
FIG. 2B is a diagram illustrating an example of a 2D planar comprising six faces.
Figure 2C:
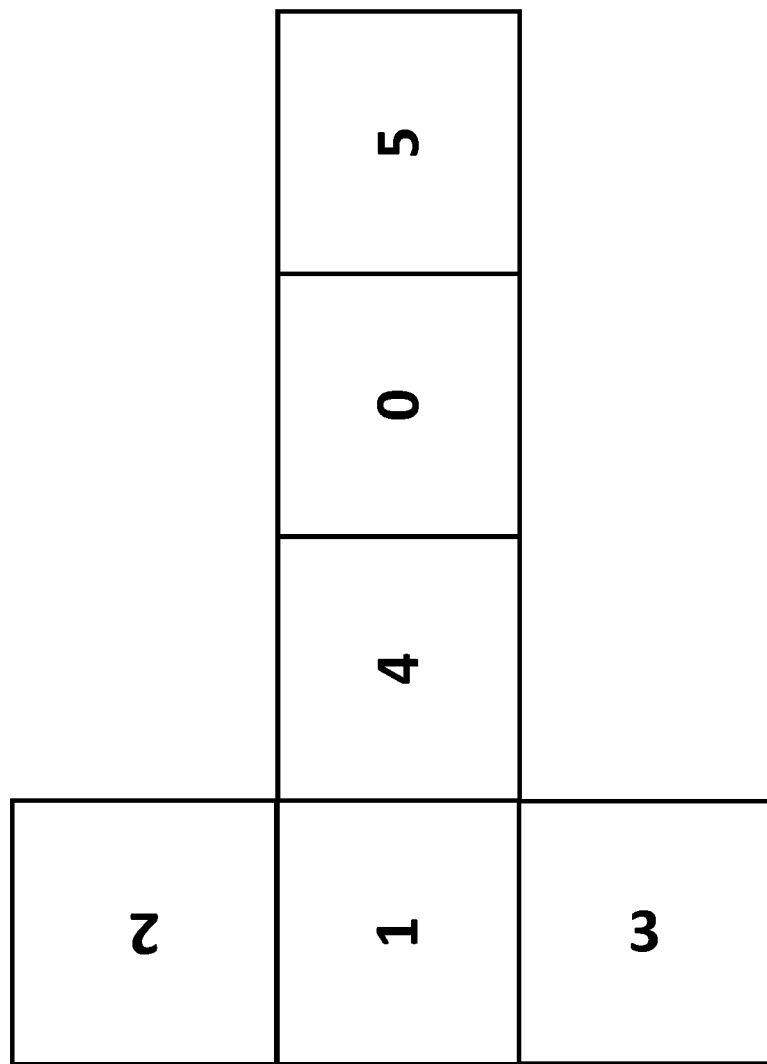
FIG. 2C is a diagram illustrating an example of a 2D planar comprising six faces.

FIGS. 2B and 2C show examples of packing six faces into a rectangular picture (e.g. a 2D planar). FIG. 2B shows an example of 3×2 frame packing and FIG. 2C shows an example of 4×3 frame packing. The orientation of a face index in the figures may indicate a corresponding rotation of the face (e.g. for better visualization). For example, in FIG. 2B, face #3 and #1 may be rotated counter-clockwise by 180 and 270 degrees, respectively, while other faces may not be rotated.

One or more face discontinuities may occur in a frame-packed picture. FIG. 2B may show a first example type of face discontinuity. As shown, a top row of three faces may be spatially neighboring faces in 3D geometry. These faces may have continuous texture. A bottom row of three faces may be spatially neighboring faces in 3D geometry (e.g. with continuous texture). The top and/or bottom row of faces may not be spatially continuous in 3D geometry. A face discontinuity (e.g. which may result in a seam between two faces) may exist in the frame-packed picture. For example, a face discontinuity may exist in the 3×2 frame-packed picture because face #0 in the top row and face #1 in the bottom row, while adjacent to each other in the frame-packed picture, may not be spatial neighbors in 3D geometry. FIG. 2B may also show a second example type of face discontinuity. For example, face #4 and face #3 may be spatial neighbors in 3D geometry. However, a face discontinuity may occur in the 3×2 frame-packed picture because face #4 and face #3 have different orientations in the frame-packed picture compared to the 3D geometry (e.g. face #3 may be rotated by 180 degrees in the counter-clockwise direction). FIG. 2C may show a third example type of face discontinuity. For example, face #2 and face #4 may be spatial neighbors in 3D geometry. However, a face discontinuity may occur in the 4×3 frame-packed picture because face #2 and face #4 are separated from each other in the frame-packed picture.

CMP may have a varying sampling density, which may be approximately equal to 1 at the center of a (e.g., each) face. CMP sampling density may increase towards edges, which may result in texture around the edges being stretched when compared to the texture at the center. CMP sampling density may be improved for different cubemap-based projections (e.g. equi-angular cubemap projection (EAC) and/or adjusted cubemap projection (ACP)), for example, by adjusting a (e.g. each) face using a non-linear warping function in the vertical and/or horizontal directions to achieve a more even sampling density. The adjustment may be performed (e.g. in EAC) using a tangent function. The adjustment may be performed (e.g. in ACP) using a second order polynomial function. A generalization of EAC and ACP may be referred to as hybrid cubemap projection (HCP). An adjustment function and its parameters (e.g. in HCP) may be tuned (e.g. individually) for a (e.g. each) face and/or direction. Cube-based projections may be packed similarly as in CMP, and this may lead to similar face discontinuities in a frame-packed picture.

Geometry padding may be provided for 360-degree video coding. Video codecs may consider 2D video captured on a plane. Padding may be performed when motion compensated prediction utilizes samples outside of a reference picture's boundaries. Repetitive padding may be performed by copying sample values from picture boundaries.

A 360-degree video encompasses video information on a whole sphere, which may (e.g. intrinsically) have a cyclic property. Reference pictures of a 360-degree video may not have "boundaries," for example, considering that the information they contain may be wrapped around a sphere. A cyclic property may hold regardless of which projection format or which frame packing may be used to represent 360-degree video on a 2D plane. Geometry padding for 360-degree video coding may be performed, for example, by padding the samples considering the 3D geometry.

Geometry padding for ERP may be provided, where ERP may be defined on a sphere with longitudes and latitudes. Given a point (u, v) to be padded (e.g. outside of an ERP picture), a point (u', v') used to derive the padding sample may be calculated, for example, according to Equations (3), (4) and (5):

$$\text{if } (u < 0 \text{ or } u \geq W) \text{ and } (0 \leq v < H), \text{ then } u' = u\%W, v' = v \quad (3)$$

$$\text{Otherwise, if } (v < 0), \text{ then } v' = -v - 1, u' = \left(u + \frac{W}{2}\right)\%W \quad (4)$$

$$\text{Otherise, if } (v \geq H), \text{ then } v' = 2*H - 1 - v, u' = \left(u + \frac{W}{2}\right)\%W \quad (5)$$

where W and H may represent the width and height of the ERP picture.

Figure 3:
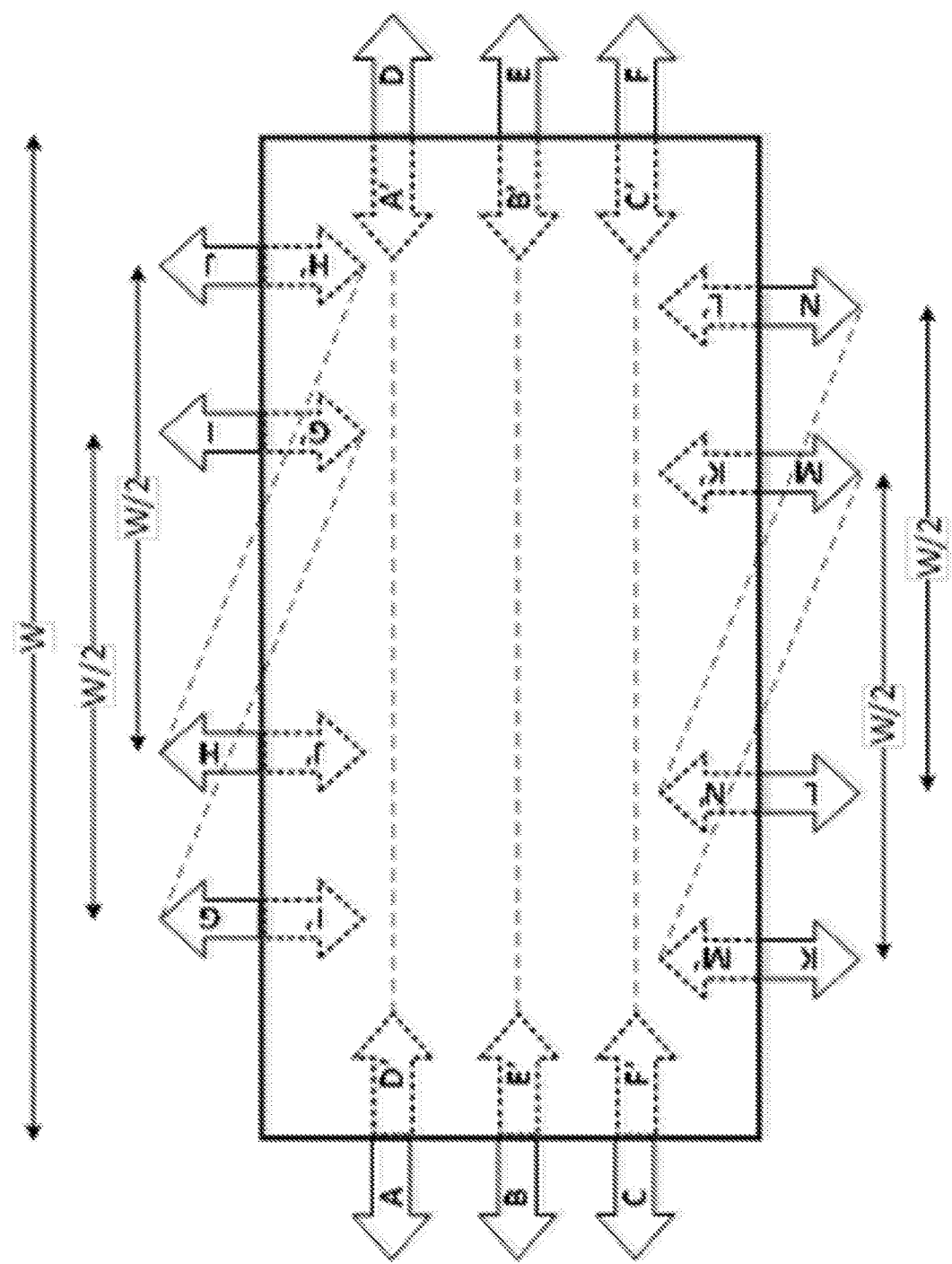
FIG. 3 is a diagram illustrating an example of geometry padding for ERP.

FIG. 3 shows an example of geometry padding for ERP. Samples located outside of the left boundary of a picture (e.g. samples at A, B and C in FIG. 3) may be padded with corresponding samples at A', B' and C' inside the right boundary of the picture. Samples outside of the right boundary of the picture (e.g. samples at D, E and F in FIG. 3) may be padded with corresponding samples at D', E' and F inside the left boundary of the picture. Samples located outside of a top boundary (e.g. samples at G, H, I and J in FIG. 3) may be padded with corresponding samples at G', H', I' and J' inside the top boundary of the picture (e.g., with an offset of half the width of the picture). Samples located outside of the bottom boundary of the picture (e.g. samples at K, L, M and N in FIG. 3) may be padded with corresponding samples at K', L', M' and N' inside the bottom boundary of the picture (e.g., with an offset of half the width of the picture).

A picture may be in CMP format. A face of such a picture may be padded using geometry padding.

Figure 4:
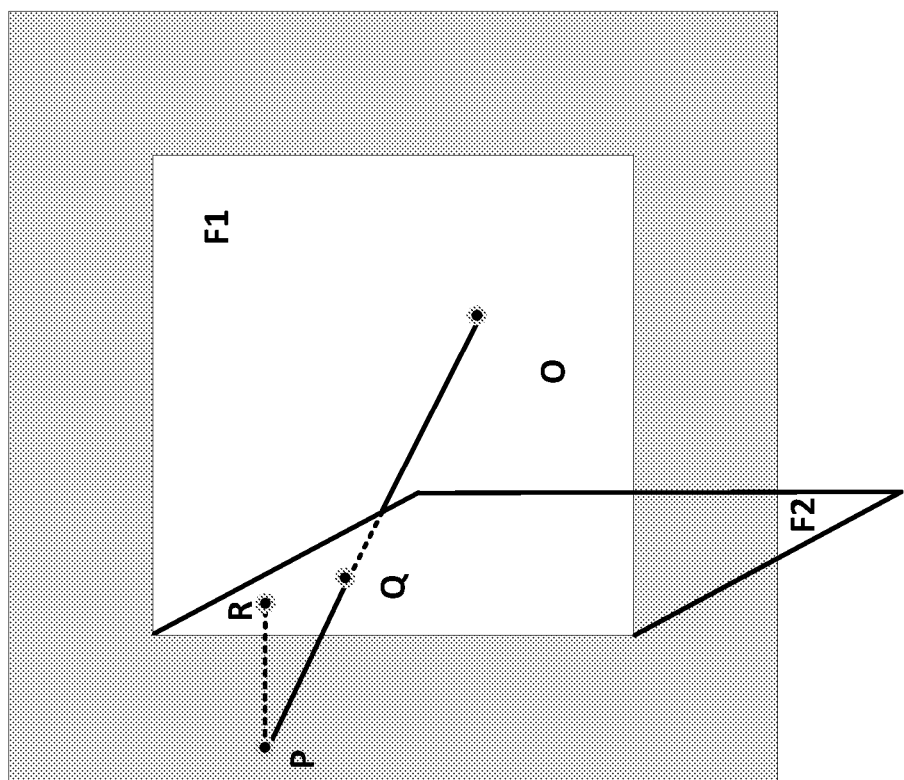
FIG. 4 is a diagram illustrating an example of geometry padding for CMP.

FIG. 4 shows an example of geometry padding for CMP in 3D geometry. As illustrated in FIG. 4, point P may be on the plane of face F1, but outside of the boundaries of F1. Padding may be performed in such a situation. For example, point O may be at the center of the corresponding sphere. R may be a left boundary point closest to P and may be inside the boundaries of face F1. Point Q may be a projection point of point P on face F2 from the center point O. Using geometry padding, the sample value at point Q (e.g. rather than at point R) may be used to fill the sample at point P.

Figure 5:
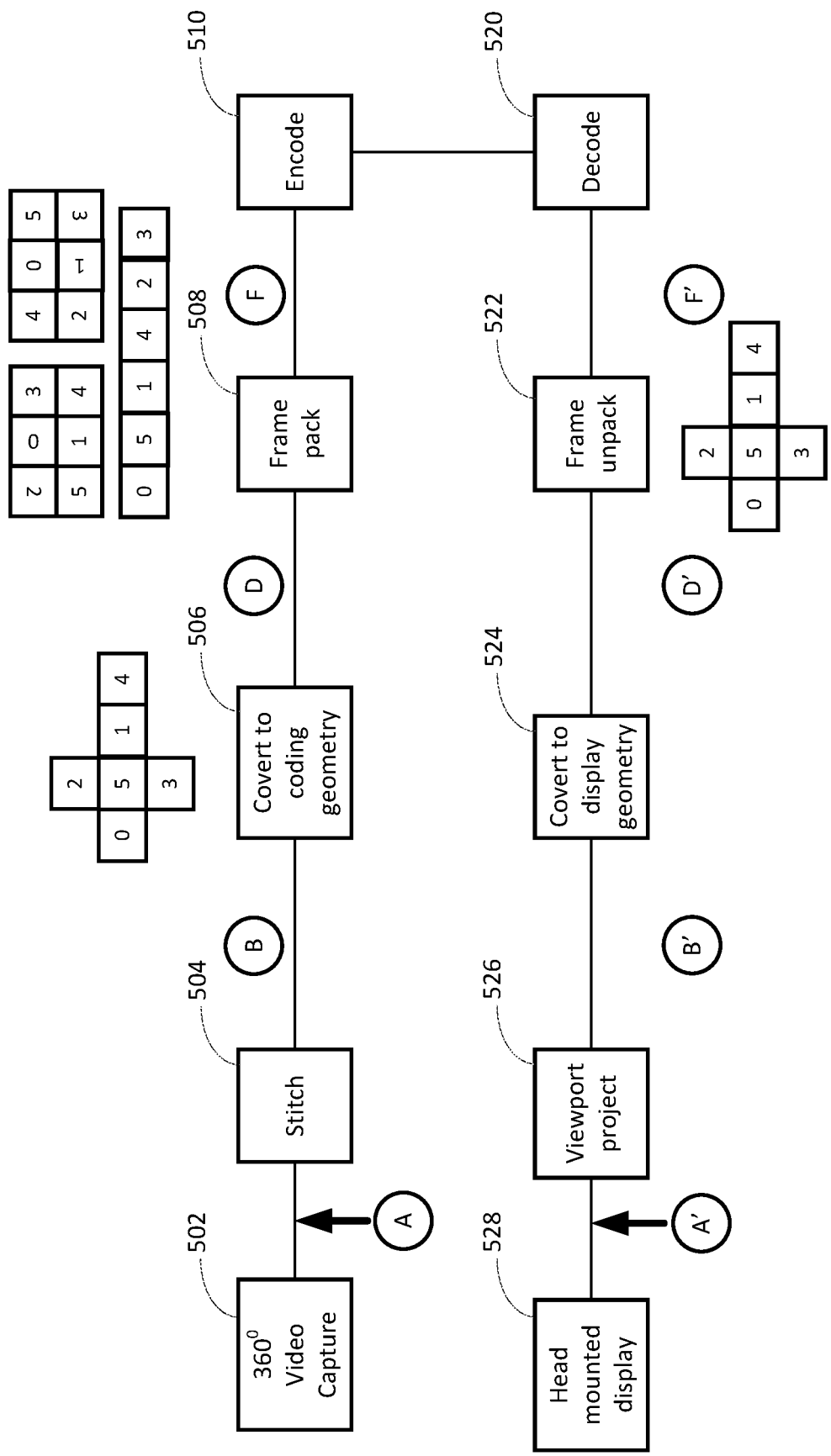
FIG. 5 is a block diagram illustrating an example of a 360-degree video processing workflow.

Hybrid video coding may be provided. FIG. 5 shows an example of a 360-degree video processing workflow. Multiple cameras may be used at 502 to capture videos that cover certain spherical space. These videos may be stitched together at 504, for example, in an equirectangular geometry structure. At 506, the equirectangular geometry structure may be converted to another geometry structure, such as a cubemap, for encoding via one or more video codecs. At 508, the faces of the coding geometry (e.g. six faces of the cubemap) may be packed (and/or rotated by a certain degree) into a rectangular area through frame packing, and the frame-packed picture may be treated (e.g. coded) as a 2D picture at 510. Different frame packing configurations may be used (e.g. a 3-row by 2-column configuration shown in FIG. 5). The coded videos may be delivered to a client, for example, via dynamic streaming or broadcasting. At 520, the videos may be decoded and/or decompressed at a receiver. At 522, a decompressed frame may be unpacked and at 524, the unpacked faces may be converted back to the original display geometry. At 526, viewport projection may be performed according to a user's viewing angle. The projected video may then be displayed via an HMD at 528.

Figure 6:
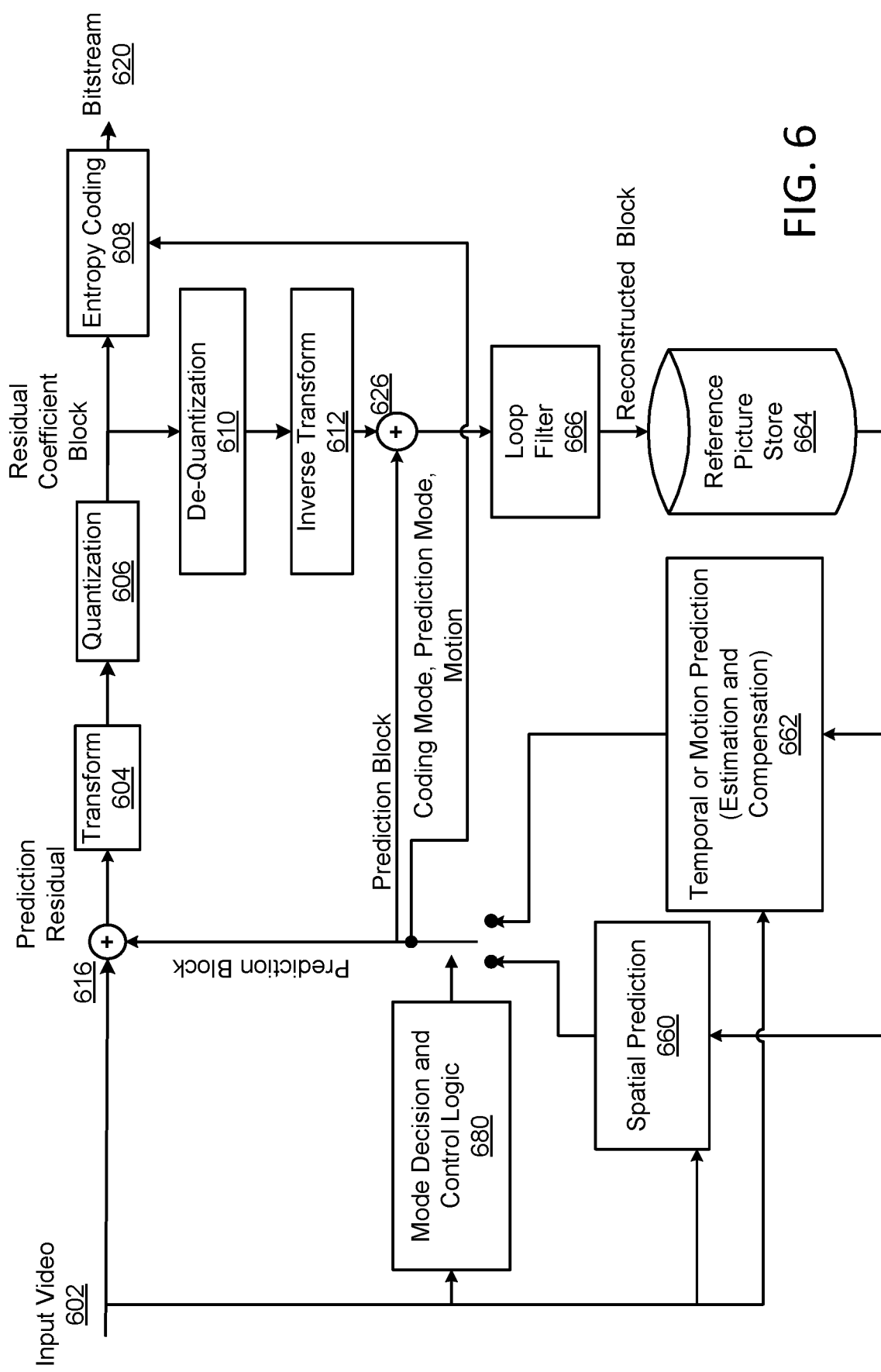
FIG. 6 is a block diagram illustrating an example of a block-based hybrid video encoding system.

FIG. 6 shows an example block-based hybrid video encoder. Using such an example encoder, an input video signal 602 may be processed block by block. Extended block sizes (e.g. extended coding units (CUs)) may be supported. For example, a CU may include 64×64 pixels. A CU may be partitioned into prediction units (PUs), for example, using one or more prediction techniques. Separate (e.g. the same or different) prediction procedures may be applied to these PUs. Spatial prediction 660 and/or temporal prediction 662 may be performed for an (e.g. each) input video block (e.g. which may be a macroblock (MB) or a CU).

Spatial prediction (e.g. intra prediction) may predict a current video block, for example, by using pixels from already coded neighboring blocks (e.g. reference samples) in the same picture or slice. Spatial prediction may reduce spatial redundancy that may be inherent in a video signal. Temporal prediction (e.g. inter prediction or motion compensated prediction) may predict a current video block by using reconstructed pixels from already coded video pictures. Temporal prediction may reduce temporal redundancy that may be inherent in a video signal. A temporal prediction signal for a given video block may be signaled, for example, by one or more motion vectors (MVs), which may indicate an amount and direction of motion between the current block and a reference block. A reference picture index (e.g. for each video block) may be sent, for example, when multiple reference pictures are supported. A reference index may be used to identify a reference picture (e.g. in reference picture store 664) to which a temporal prediction signal may belong.

A mode decision and control logic unit 680 in the encoder may (e.g. after spatial and/or temporal prediction) choose a suitable prediction mode based on rate-distortion optimization. A prediction block may be subtracted from a current video block at 616. The prediction residuals may be de-correlated (e.g. using a transform unit 604) and a quantization unit 606 (e.g. to achieve a target bit rate). Quantized residual coefficients may be inverse quantized at 610 and inverse transformed 612, e.g., to form a reconstructed residual. The reconstructed residual may be added back to the prediction block at 626, for example, to form a reconstructed video block. In-loop filtering 666 (e.g. a de-blocking filter and/or adaptive loop filter) may be applied to the reconstructed video block, for example, before it is put in the reference picture store 664 and used to code future video blocks. An entropy coding unit 608 may produce an output video bitstream 620, for example, by compressing and packing coding mode (e.g. inter or intra) information, prediction mode information, motion information and/or quantized residual coefficients into the bitstream 620.

Figure 7:
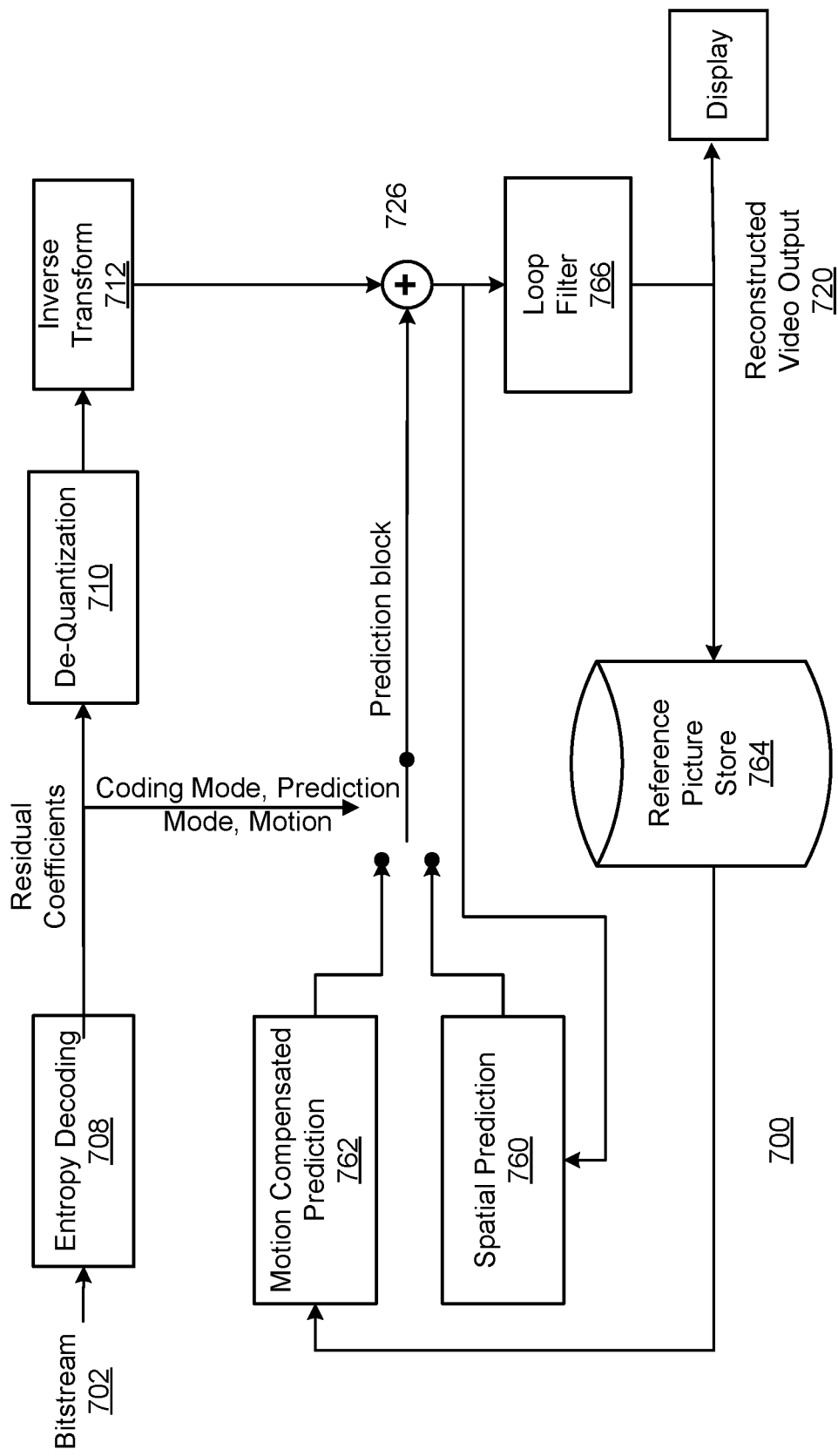
FIG. 7 is a block diagram illustrating is an example of a block-based video decoder.

FIG. 7 is an example of a block-based video decoder. A video bitstream 702 (e.g. the video bitstream 620 of FIG. 6) may be unpacked and entropy-decoded at an entropy decoding unit 708. Coding mode and prediction information may be extracted and/or sent to a spatial prediction unit 760 (e.g. when intra-coded) or a temporal prediction unit 762 (e.g. when inter-coded) to form a prediction block. Residual transform coefficients may be provided to an inverse quantization (de-quantization) unit 710 and/or an inverse transform unit 712, e.g., to reconstruct a residual block. The prediction block and residual block may be added at 726. Filtering (e.g. in-loop filtering) may be applied to the reconstructed block at 766, for example, before it is stored in a reference picture store 764. The reconstructed video 720 may be provided to a display device and/or used to predict future video blocks.

Figure 8:
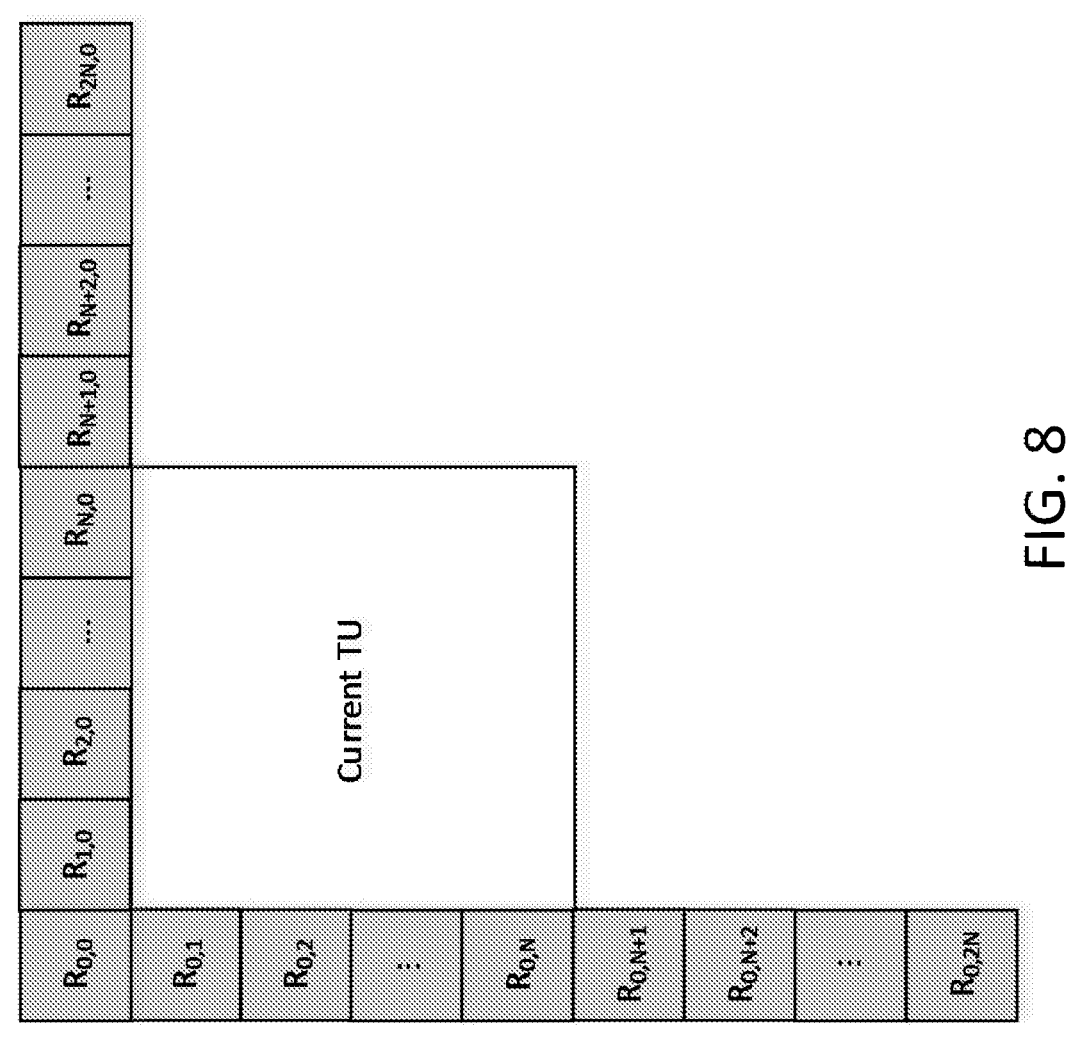
Figure 9:
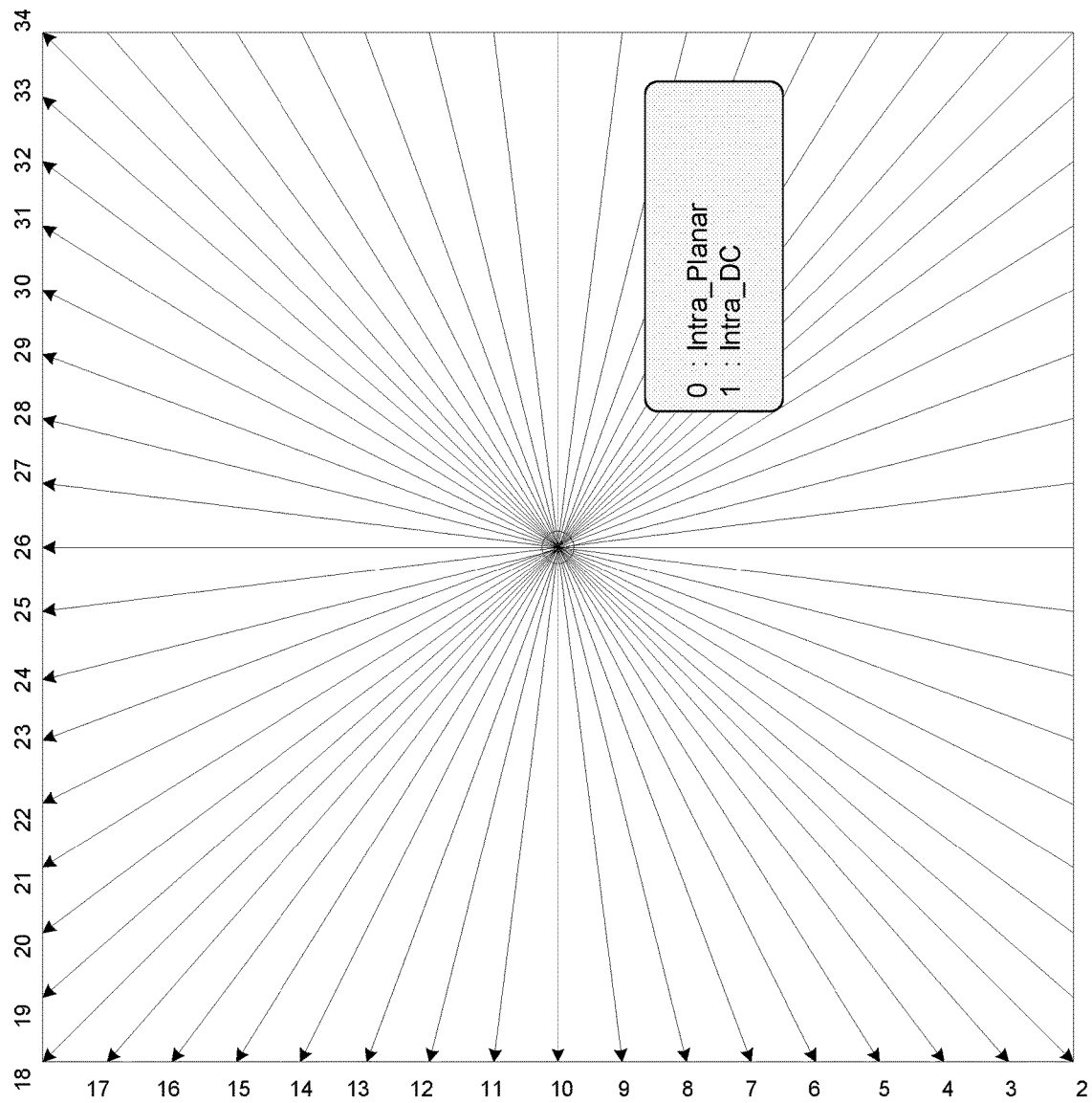
FIG. 9 is a diagram illustrating example intra prediction directions.

Codecs may be used to code 2D planar rectilinear video. The coding may exploit spatial and/or temporal correlations to remove information redundancy (e.g. via intra prediction and/or inter prediction). FIG. 8 shows example reference samples that may be used in intra prediction of a current transform unit (TU). These reference samples may include reconstructed samples from the left and/or top neighbors of the current TU. Multiple intra prediction modes or directions (e.g. 35 intra prediction modes) may be used including, for example, planar (0), DC (1), angular predictions (2-34). FIG. 9 shows example intra prediction directions. An intra prediction mode may be selected at the encoder side, for example, by comparing the distortion between prediction samples generated by each intra prediction mode and the original samples, and by selecting the prediction mode that generates the minimum distortion. An intra prediction mode may be coded (e.g. signaled) in a video bitstream.

Figure 10:
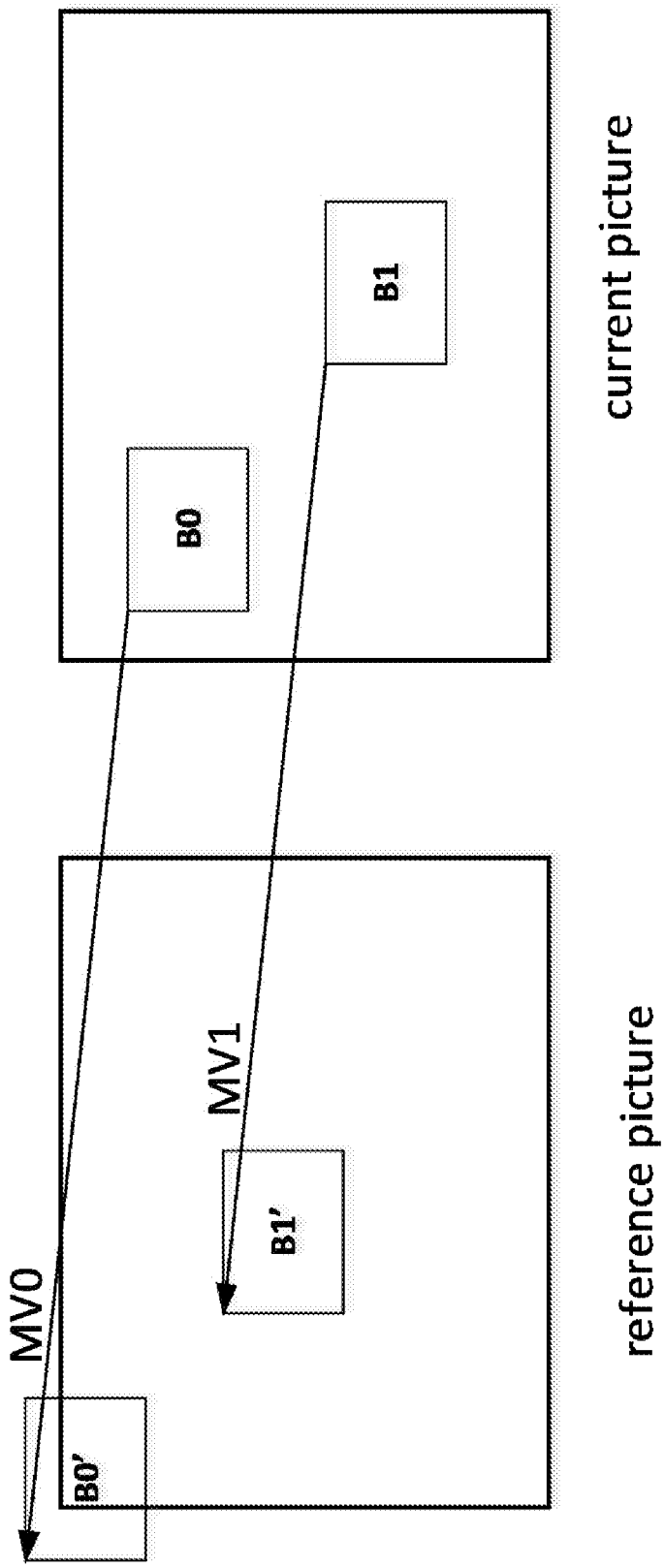
FIG. 10 is a diagram illustrating an example of inter prediction with one motion vector (MV).

FIG. 10 shows an example of inter prediction with one motion vector (MV), which may be referred to as uni-prediction. Blocks B0' and B1' may belong to a reference picture and may be reference blocks of blocks B0 and B1 in a current picture, respectively. Reference block B0' may be partially outside a picture boundary. One or more unknown samples outside of a picture boundary may be filled through a padding process.

Figure 11:
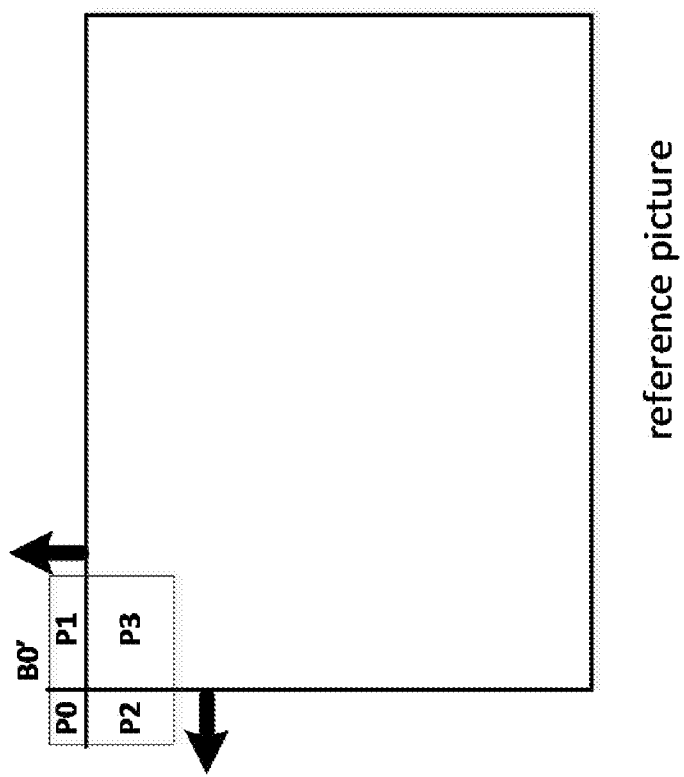
FIG. 11 is a diagram illustrating an example of padding for reference samples outside of a picture boundary.

FIG. 11 shows an example of padding for reference samples outside of a picture boundary (e.g. part of block B0' in FIG. 10 that is outside the picture boundaries). As shown, block B0' may include 4 parts (e.g. P0, P1, P2 and P3). Parts P0, P1, P2 may be outside a picture boundary and may be filled through a padding process. For example, part P0 may be filled with a top-left sample of a picture, part P1 may be filled via vertical padding (e.g., using a topmost row of the picture), and part P2 may be filled with horizontal padding (e.g. using a leftmost column of the picture). Motion vector prediction and/or merge mode may be used for inter-coding, for example, to encode motion vector information. Motion vector prediction may use one or more motion vectors from neighboring PU(s) or temporal collocated PU(s) to predict a current MV. Either or both of the encoder and decoder may construct a motion vector predictor candidate list. For example, the encoder may construct a motion vector predictor candidate list, code the index of a selected MV predictor from the candidate list, and signal the index to the decoder. The decoder may also construct an MV predictor list and may use an entry on the list having the signaled index as the predictor of a current PU's MV. A merge mode may re-use MV information of spatial and/or temporal neighboring PUs, for example, so that explicit coding of motion vectors for a current PU may be skipped/avoided. The encoder and decoder may construct their respective motion vector merge candidate lists in the same manner.

Figure 12:
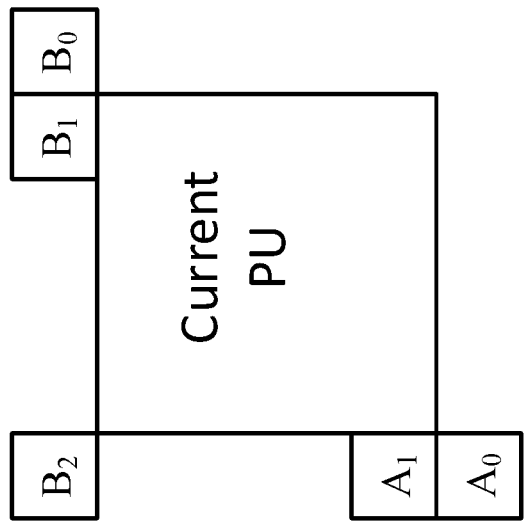
FIG. 12 is a diagram illustrating example spatial neighbors that may be used in a merge process to derive spatial merge candidates.

FIG. 12 shows example of spatial neighbors (e.g. bottom left, left, top right, top, top left) that may be used (e.g. in a merge process) to derive spatial merge candidates. A selected merge candidate index may be coded. A merge candidate list may be constructed, for example, by a decoder (e.g. in the same manner as by an encoder). An entry with a signaled merge candidate index may be used as an MV of a current PU. A filter (e.g. an in-loop deblocking filter (DBF)) may be applied to reconstructed samples. A DBF may reduce blocking artifacts that may be introduced during block-based coding. A DBF may be applied to samples located at PU and/or TU boundaries. The use of a DBF may be skipped for samples located at picture boundaries or when filtering is disabled at slice and/or tile boundaries. Horizontal filtering may be applied for vertical boundaries. Vertical filtering may be applied for horizontal boundaries. For example, with two adjacent blocks, P and Q, having a common 8×8 grid boundary, a filter strength of 2 may be assigned, for example, when one of the blocks is intra-coded. A filter strength of 1 may be assigned, for example, when one or more of the following conditions are satisfied: (i) P or Q includes at least one non-zero transform coefficient; (ii) the reference indices of P and Q are not be equal; (iii) the motion vectors of P and Q are not equal; and/or (iv) the difference between one or more motion vector components of P and Q is equal to or greater than one integer sample. A filter strength of 0 may be assigned (e.g. DBF may not be applied) if none of the aforementioned conditions are satisfied. Thresholds, $t_C$ and $\beta$, may be determined from one or more pre-defined tables based on filter strength and/or average quantization parameter (QP) of P and Q. No filtering, strong filtering, or weak filtering may be applied for luma samples, for example, based on the value of p and/or local sample differences.

Figure 13B:
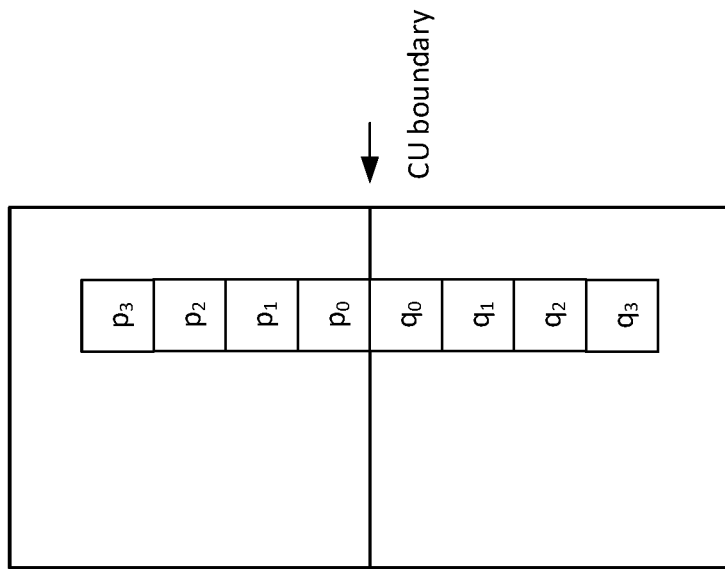
FIGS. 13A and 13B are diagrams illustrating samples that may be involved in a deblocking filter (DBF) on/off decision, filter selection and/or filtering.
Figure 13A:
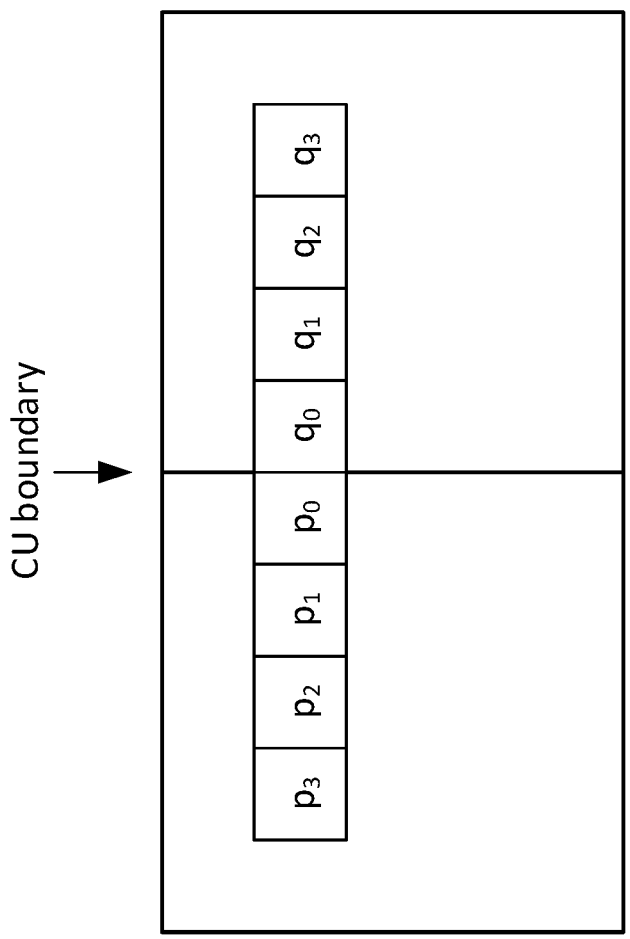

FIGS. 13A and 13B show examples of how certain samples may be used in a DBF on/off decision, in filter selection and/or in the filtering operation itself. For strong filtering, three sample columns (or rows) on each side of a boundary may be filtered in a horizontal (or vertical) direction. For weak filtering, up to two samples on each side of the boundary may be filtered depending on the value of 0 and sample differences. A filtered sample value (e.g. in weak filtering) may be clipped, for example, in the range of $\pm 2t_C$ around the unfiltered sample value. For chroma samples, one or more of the following may apply: no filtering and/or normal filtering. Normal filtering may be applied, for example, when filter strength is greater than one. In examples (e.g. for chroma sample filtering), one sample on each side of the boundary may be filtered.

Padding associated with face discontinuity may be applied as a pre-processing step in conjunction with blending at a reconstruction stage, for example, to reduce seam artifacts. Padding may increase the number of coded samples, which may increase the bitrate. In some examples (e.g. for ERP with a resolution of 4096×2048 luma samples), padding of 8 luma samples applied to the left and right boundaries may increase the number of coded samples by 0.39%. In other examples (e.g. for CMP with a face resolution of 1184×1184 luma samples and 3×2 frame packing), padding of 8 luma samples applied to the boundaries of each face row may increase the number of coded samples by 1.81%. Seam artifacts may be reduced without increasing the number of coded samples, for example, by reducing the resolution of one or more faces in either direction, e.g., so the picture after padding may have the same number of samples. When the actual resolution is lower, visual quality may be affected. A picture may be correctly reconstructed in a projection format without referring to any padding samples. For example, locations of the padding samples may be signaled (e.g., depending on a projection format), and the padded samples may be discarded during reconstruction.

As described herein, a face discontinuity associated with two faces (e.g. a first face and a second face) of a face-packed frame (e.g. a frame-packed picture) may occur. The two faces may be spatial neighbors in 3D geometry and may become discontinuous (e.g. separated) in a 2D frame-packed picture. As such, there may be two sides associated with a face discontinuity (e.g. the two sides may respectively correspond the first and second faces that become discontinuous). A first side may coincide with (e.g., be represented by) an edge of the first face and a second side may coincide with (e.g. be represented by) an edge of the second face. Face discontinuity filtering may be applied, for example, using coded samples available on either or both sides of the face discontinuity (e.g. along the face edges that coincide with the sides). Filtering may be applied, for example, as an in-loop filter and/or during post-processing (e.g. as a post-processing step). Filtering based on coded samples may reduce the number of samples to be processed/signaled while maintain the resolution of the video content. Different filtering techniques may be utilized including, for example, distance based weighting, deblocking filtering, and/or edge preserving based filtering (e.g. bilateral filtering).

In-loop or post-processing filtering of a face discontinuity may reduce seam artifacts resulting from a face discontinuity. As explained herein, discontinuity of video content may be introduced (e.g. due to face packing) and filtering may be performed (e.g. on both sides associated with the face discontinuity) to remove or reduce the discontinuity. If two faces do not include discontinuity in video content, then filtering may not need to be applied. One or more face discontinuities may be identified in a frame-packed picture. Frame packing information may be signaled in a video bitstream and may be used to determine such face discontinuities. An indicator may be signaled to specify whether none, all or a subset of the face discontinuities should be filtered. Additional information may be signaled to further indicate which face discontinuities (e.g. identifying a specific subset of face discontinuities) should be filtered. Endpoint coordinates of one or both sides of a face discontinuity may be (e.g. explicitly) signaled in a video bitstream.

A filtering operation for a face discontinuity may comprise fetching samples from the two sides associated with the face discontinuity. These samples may be located in different areas of a frame-packed picture. A first set of samples (e.g. which may belong to one or more coding blocks) on one side of the face discontinuity may be fetched and filtered together with a second set of samples (e.g. which may belong to one or more coding blocks) on the other side of the face discontinuity. While the first and second sets of samples may represent continuous content in the original spherical content representation, discontinuity may exist between the two sets of samples in the frame-packed picture, e.g. due to lossy compression associated with the specific face packing geometry used. Filtering may be utilized to overcome such artificial discontinuity. Samples on both sides of a face discontinuity may be fetched, e.g. for simple geometries that comprise a single face (e.g., ERP) or for more complex geometries that comprise multiple faces (e.g., CMP). In examples, a geometry may be unfolded (e.g. taking each face and putting them next to each other on the same 2D plane) and samples (e.g. coded samples derived via the unfolding) from adjacent faces may be used (directly used) in a filtering operation. Such a technique may be referred to as face-based padding. In examples, a face may be padded using geometry padding, and non-padded samples on either or both sides of a face discontinuity may be filtered using the padded samples (e.g. the padded samples may be fetched using the various sample fetching techniques described herein).

Face-based padding may result in the filtering of uncorrelated samples, which may generate visible seam artifact. For example, in some projection formats (e.g. HCP), sampling may not be the same for each face (e.g., because parameters used for the sampling may be different between neighboring faces), and the differences may result in uncorrelated samples being filtered. In this type of situations (e.g. when HCP is used), face discontinuity filtering may be applied to one or more portions of the face discontinuity.

One or more face discontinuities in a frame-packed picture may be determined and signaled (e.g. to a decoder). Frame packing information may be signaled in a video bitstream, for example, to identify a (e.g. each) face (e.g. face identity and/or orientation) in a frame-packed picture. A shared edge between neighboring faces of a frame-packed picture may be deemed continuous if those faces share the same edge in the original spherical content representation. An edge between neighboring faces of a frame-packed picture may be deemed discontinuous if those faces do not share a same edge in the original spherical content representation. In the latter case, it may be determined that a face discontinuity may exist in the frame-packed picture and two sides associated with the face discontinuity may be identified to remove artifacts caused by the face discontinuity. The two sides associated with a face discontinuity may represent two sides of a shared edge in the original spherical content representation. In the 2D frame-packed picture, the two sides may respectively coincide with a first edge of a first face and a second edge of a second face.

Face discontinuities in a frame-packed picture may not all be filtered. An optimization process may be used to determine whether a face discontinuity should be filtered (e.g., based on bitrate, picture quality and/or complexity). An indicator may be signaled in a video bitstream to specify whether none, all or a subset of face discontinuities may be filtered. When a subset of face discontinuities is to be filtered, the video bitstream may indicate identify the specific face discontinuities that should be filtered. Face discontinuities may be scanned in a specific order (e.g. a predetermined order known to the encoder and decoder). A flag may be signaled for a face discontinuity (e.g. for each face discontinuity) to specify whether filtering should be applied for the face discontinuity.

The endpoint coordinates of one or more face edges representing (e.g. coinciding with) respective sides of a face discontinuity in a frame-packed picture may be signaled (e.g. explicitly) in a video bitstream, as illustrated below. Horizontal and/or vertical discontinuities may be identified via the signaling. Diagonal discontinuities may also be identified via the signaling, for example, for triangular based geometries such as Octahedral Projection (OHP) and/or Icosahedral Projection (ISP). 2D positional information associated with a face discontinuity may be provided indicating the positions of a first starting point and a first endpoint of a first side of the face discontinuity, and the positions of a second starting point and a second endpoint of a second side of the face discontinuity. The 2D positional information may additionally indicate respective positions of a first and second faces associated with the face discontinuity relative to the first and second sides of the face discontinuity. Syntax elements related to the foregoing signaling mechanism may be provided, e.g. at a video level as illustrated by Table 1 below.

A parameter (e.g. face_discontinuity_parampresent_flag) may be included in the parameter set to specify whether face boundary discontinuity exists and/or whether syntax elements related to one or more face discontinuities (e.g., num_face_discontinuities, face_discontinuity_position, face_discontinuity_start_point_x, face_discontinuity_start_point_y, face_discontinuity_end-point_x and face_discontinuity_end_point_y) are present in the video bitstream. A face discontinuity may be associated with two faces in a frame-packed picture. Information regarding the frame-packed picture may also be indicated/included in the video bitstream. A device (e.g. a decoder) receiving the video bitstream may determine, e.g., based on the value of the parameter face_discontinuity_parampresent_flag, whether one or more face discontinuities exist in the frame-packed picture. In examples, if the value of face_discontinuity_param_present_flag is one, the device may determine that one or more face discontinuies exist in the frame-packed picture, and/or that syntax elements related to the face discontinuities are included in the video bitstream. If the value of face_discontinuity_param_present_flag is zero, the device may determine that no face discontinuity need to be dealt with and/or that no syntax elements related to face discontinuity are included in the video bitstream. The device may process the boundary samples associated with a face without applying a filter if the value of face_discontinuity_param_present_flag is zero (e.g. if the decoder determines that discontinuity does not exist along the boundary). In examples, the parameter face_discontinuity_param_presen_flag may not be present in the video bitstream, and the device may process the video bitstream as if the value of face_discontinuity_param_present_flag is zero.

TABLE 1

Video parameter set raw byte sequence payload (RBSP)

| | Descriptor |
|---|---|
| video_parameter_set_rbsp( ) { | |
| ... | |
|   face_discontinuity_param_present_flag | u(1) |
|   if( face_discontinuity_param_present_flag) { | |
|     num_face_discontinuities | ue(v) |
|     for( i = 0; i < num_face discontinuities; ++ ) { | |
|       for( j = 0; j < 2; ++) { | |
|         face_discontinuity_position[ i ][ j ] | u(1) |
|         face_discontinuity_start_point_x[ i ][ j ] | ue(v) |
|         face_discontinuity_start_point_y[ i ][ j ] | ue(v) |
|         face_discontinuity_end_point_dx[ i ][ j ] | se(v) |
|         face_discontinuity_end_point_dy[ i ][ j ] | se(v) |
|       } | |
|     } | |
|   } | |
| ... | |
| } | |

The video bitstream (e.g. a parameter set in the video bitstream) may include one or more of the following parameters (e.g. if face_discontinuity_paramp_present_flag is set to one). A parameter num_face_discontinuities may be included to specify a number of face discontinuities (e.g. a total number of face discontinuities) in the frame-packed picture. The value of num_face_discontinuities may be assumed to be equal to 1 if the parameter is not present in the video bitstream. In examples, a parameter num_face_discontinuities_minus1 may be signaled (e.g. instead of signaling num_face_discontinuities), e.g. to reduce the number of bits needed to code the parameter, and a receiving device (e.g. a decoder) may determine the actual value of num_face_discontinuities based on the signaled value of num_face_discontinuities_minus1.

A parameter face_discontinuity_position[i][j] may be included to specify the position of one of the faces associated with a face discontinuity relative to a j-th side of the i-th face discontinuity, wherein a first side of the face discontinuity may be indicated by j=0 and a second side may be indicated by j=1. For example, if face_discontinuity_position[i][j] has a value of 0, the receiving device may determine that a corresponding face is located below and/or to the right of the j-th side of the i-th face discontinuity. If face_discontinuity_position[i][j] has a value of 1, the receiving device may determine that a corresponding face is located above and/or to the left of the j-th side of the i-th face discontinuity.

A parameter face_discontinuity_start_point_x[i][j] may be included to specify the x coordinate of a starting point of an edge located on the j-th side of the i-th face discontinuity. The edge may belong to one of the two faces associated with the i-th face discontinuity, and may represent one side of the face discontinuity (e.g., as indicated by the value of j). The x coordinate may be defined within the frame-packed picture that includes the i-th face discontinuity. The value of face_discontinuity_start_point_x[i][j] may, for example, be in a range of 0 to picture_width−1, inclusively, wherein picture_width may represent the width of the frame-packed picture.

A parameter face_discontinuity_start_pointy[i][j] may be included to specify they coordinate of the starting point of the edge described above. The y coordinate may be defined within the frame-packed picture that includes the i-th face discontinuity. The value of face_discontinuity_start_point_y[i][j] may, for example, be in a range of 0 to picture_height−1, inclusively, wherein picture_height may represent the height of the frame-packed picture.

A parameter face_discontinuity_end_point_dx[i][j] may be included to specify a difference between (e.g. the relative positions of) the x coordinate of the starting point of the edge and the x coordinate of an endpoint of the edge. The value of face_discontinuity_end_point_dx[i][j] may, for example, be in a range of −picture_width+1 to picture_width−1, inclusively, wherein picture_width may represent the width of the frame-packed picture. Based on face_discontinuity_end_point_x[i][j] and face_discontinuity_end_point_dx[i][j], the x coordinate of the endpoint of the edge, face_discontinuity_end_point_x[i][j], may be derived in accordance with the following: face_discontinuity_end_point_x[i][j]= face_discontinuity_end_point_dx[i][j]+face_discontinuity_start_point_x[i][j]. The actual value of face_discontinuity_end_point_x[i][j] may be signaled directly in the vide bitstream (e.g. instead of signaling face_discontinuity_end_point_dx[i][j]).

A parameter face_discontinuity_end_point_dy[i][j] may be included to specify a difference between (e.g. the relative positions of) the y coordinate of the starting point of the edge and the y coordinate of the endpoint of the edge. The value of face_discontinuity_end_point_dy[i][j] may, for example, be in the range of −picture_height+1 to picture_height−1, inclusively, wherein picture_height may represent the height of the frame-packed picture. Based on face_discontinuity_end_point_y[i][j] and face_discontinuity_end_point_dy[i][j], the y coordinate of the endpoint of the edge, face_discontinuity_end_point_y[i][j], may be derived in accordance with the following: face_discontinuity_end_point_y[i][j]= face_discontinuity_end_point_dy[i][j]+face_discontinuity_start_point_y[i][j]. The actual value of face_discontinuity_end_point_y[i][j] may be signaled directly in the vide bitstream (e.g. instead of signaling face_discontinuity_end_point_dy[i][j]).

One or more of the parameters described herein may be defined and/or signaled at a video level. One or more of the parameters described herein may be defined/signaled at a sequence level and/or at a picture level (e.g. when projection geometry and/or frame packing may be changed during video encoding). Fixed length coding of the syntax elements may be used (e.g. instead of variable length coding). The bit length of a syntax element may be determined, for example, by ceil(log 2(picture_width)) or ceil(log 2(picture_height)).

As described herein, a face discontinuity may be associated with multiple (e.g. two) sides, for example, corresponding to respective faces (e.g. two faces) associated with the face discontinuity. The faces included in a frame-packed picture may be packed in any configuration and some faces may have been rotated. When the multiple (e.g. two) sides associated with a face discontinuity are signaled as described herein, the receiving device may be able to determine how to filter (e.g. jointly filter) samples from the multiple (e.g. both) sides of the face boundary independent of the frame packing scheme and/or projection format used (e.g. without having or receiving information about such frame packing scheme and/or projection format). For example, by utilizing the aforementioned signaling technique, the receiving device may be able to filter the samples associated with the face discontinuity (e.g. samples from both sides of the face discontinuity) even if the receiving device does not receive or otherwise possess information about the frame packing scheme and/or the projection format used. The two sides (e.g. two faces) associated with a face discontinuity may be jointly filtered, e.g., as if the two sides are neighbors of or adjacent to each other.

Figure 14A:
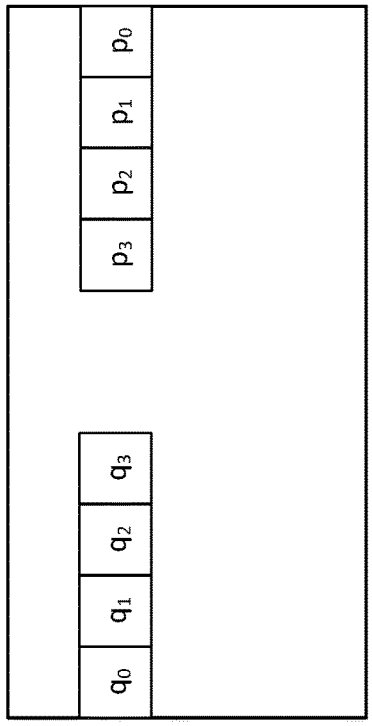
FIG. 14A is a diagram illustrating an example of fetching samples to filter a face discontinuity for ERP.
Figure 14B:
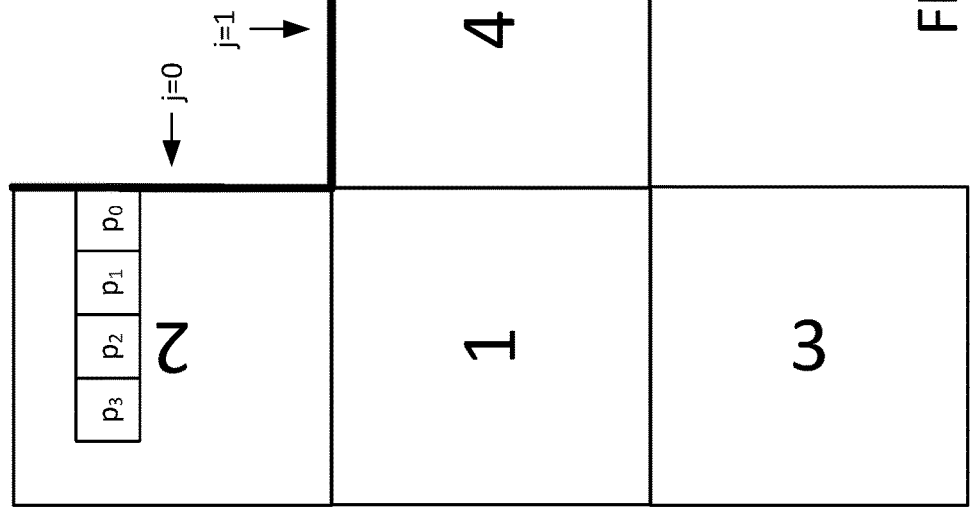
FIG. 14B is a diagram illustrating an example of fetching samples to filter a face discontinuity for CMP.
Figure 14C:
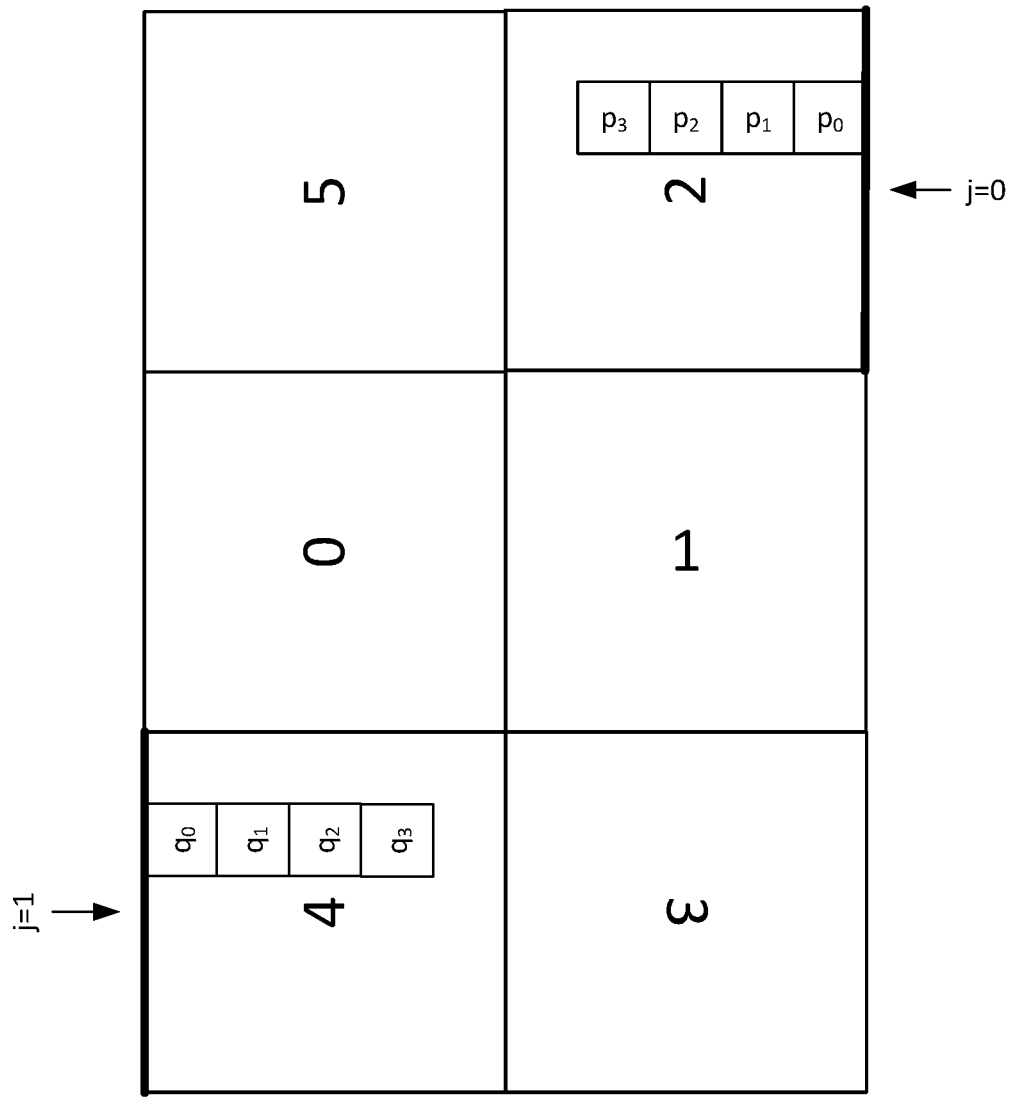
FIG. 14C is a diagram illustrating an example of fetching samples to filter a face discontinuity for CMP.

FIG. 14A shows an example of sample fetching related to face discontinuity filtering for the ERP format. FIG. 14B shows an example of sample fetching related to face discontinuity filtering for a 4×3 CMP format. FIG. 14C shows an example of sample fetching related to face discontinuity filtering for a 3×2 CMP format. Consider an example in which CMP with a 4×3 packing configuration (e.g. illustrated in FIG. 14B) and a face size of N×N luma samples are used, a discontinuous face boundary (e.g. shown by bold lines in FIG. 14B) may be signaled in accordance with the following, wherein a first side of the face discontinuity may be represented by index 0 and a second side of the face discontinuity may be represented by index 1.

single face (e.g., ERP), the fetching operation may be simple. FIG. 14A shows an example of sample fetching in an ERP picture for purposes of filtering a portion of the left and/or right boundaries of the picture. In this type of geometries, the location of a spherical neighbor of a sample may be determined rather simply. When a geometry comprises multiple faces, the determination of spherical neighbors may become more complex. In those complex cases, a geometry may be unfolded (e.g. taking each face and putting them next to each other on the same 2D plane) and samples from adjacent faces (e.g. which may be referred to as face-based padding) may be used (e.g. directly used) to filter a face discontinuity.

FIGS. 14B and 14C show examples of sample fetching related to the filtering of a face discontinuity in a CMP

```
facediscontinuityposition[ i ][ 0 ] = 1              face_discontinuity_position[ i ][ 1 ] = 0
face.discontinuity..start_point_x[ i ][ 0 ] = N-1    face_discontinuity_start_point_[ i ][ 1 ] = 2N-1
face. discontinuity_start_point_y[ i ][ 0 ] = 0      face_discontinuity_start_point_y[ i ][ 1 ] = N
face_discontinuity_end_point_dx[ i ][ 0 ] = 0        face_discontinuity_end_point_dx[ i ][ 1 ] =
                                                       -N+1
face_discontinuity_end_point_dy[ i ][ 0 ] = N-1      face_discontinuity_end_point_dy[ i ][ 1 ] = 0
```

A coding device (e.g., a decoder) may determine how to filter multiple (e.g. both) sides of a face discontinuity (e.g. to reduce seam artifacts associated with the boundary) in response to receiving the signaling. The filtering operation may be applied as in-loop filtering and/or during post-processing. Different filtering techniques may be used including, for example, distance-based weighting, DBF, or edge preserving-based filtering (e.g. bilateral filtering).

DBF may be applied to samples that may be located at PU and/or TU boundaries. In examples, the filtering strength of DBF may be determined, for example, based on one or more coding modes and/or attributes of the blocks located on each side of a PU and/or TU boundary (e.g. quantization parameters (QPs), transform coefficients, reference indices and/or motions vectors). A face discontinuity may be associated with multiple blocks on each side of the face discontinuity, and these blocks may be independently coded (e.g. without considering whether neighboring blocks share a same PU and/or TU boundary). Accordingly, when DBF is used to filter a face discontinuity, consideration of the coding modes and/or attributes of the blocks located on each side of the face discontinuity may be skipped (e.g. the motion vectors of the blocks on each side of the face discontinuity may not be comparable because those blocks may not be continuous anymore). Processing speed of the samples may be increased as a result of not considering the coding modes and/or attributes of the blocks located on each side of the face discontinuity. DBF may be applied for a face discontinuity using a fixed strength (e.g. a strength of 2). A slice level QP may be used to determine one or more parameters (e.g. $t_C$ and/or 0) of the DBF operation. The DBF operation may be performed for the face discontinuity on the basis of N×N grids (e.g. 4×4 or 8×8 grids), for example, to reduce computational complexity and/or to improve parallel-processing performance. The samples located on each side of the face discontinuity may be used to determine whether strong or weak filtering may be applied.

To facilitate the filtering of a face discontinuity in a frame-packed picture, samples may be fetched from both sides of the face discontinuity. These samples may be located in different areas of the frame-packed picture (e.g. the sample may not be spatially continuous in the frame-packed picture). For geometries such as those comprising a picture. Face-based padding (e.g. using samples from an adjacent face) may be used in this type of cases, for example, when the ratio of an offset of a sample from a concerned face boundary to a length of the face is relatively small (e.g. below a certain threshold). The sample used for determining the offset may be one that is located farthest away from the face boundary. In this type of cases, distortions introduced by not using a spherical neighbor (e.g. a true spherical neighbor) may be limited. Alternatively or additionally, geometry padding may be used to fetch spherical neighbors located outside of a face. Either or both of the faces associated with the face discontinuity may be padded using geometry padding. Face discontinuity filtering may then be applied (e.g. independently) to each side of the face discontinuity.

Figure 15:
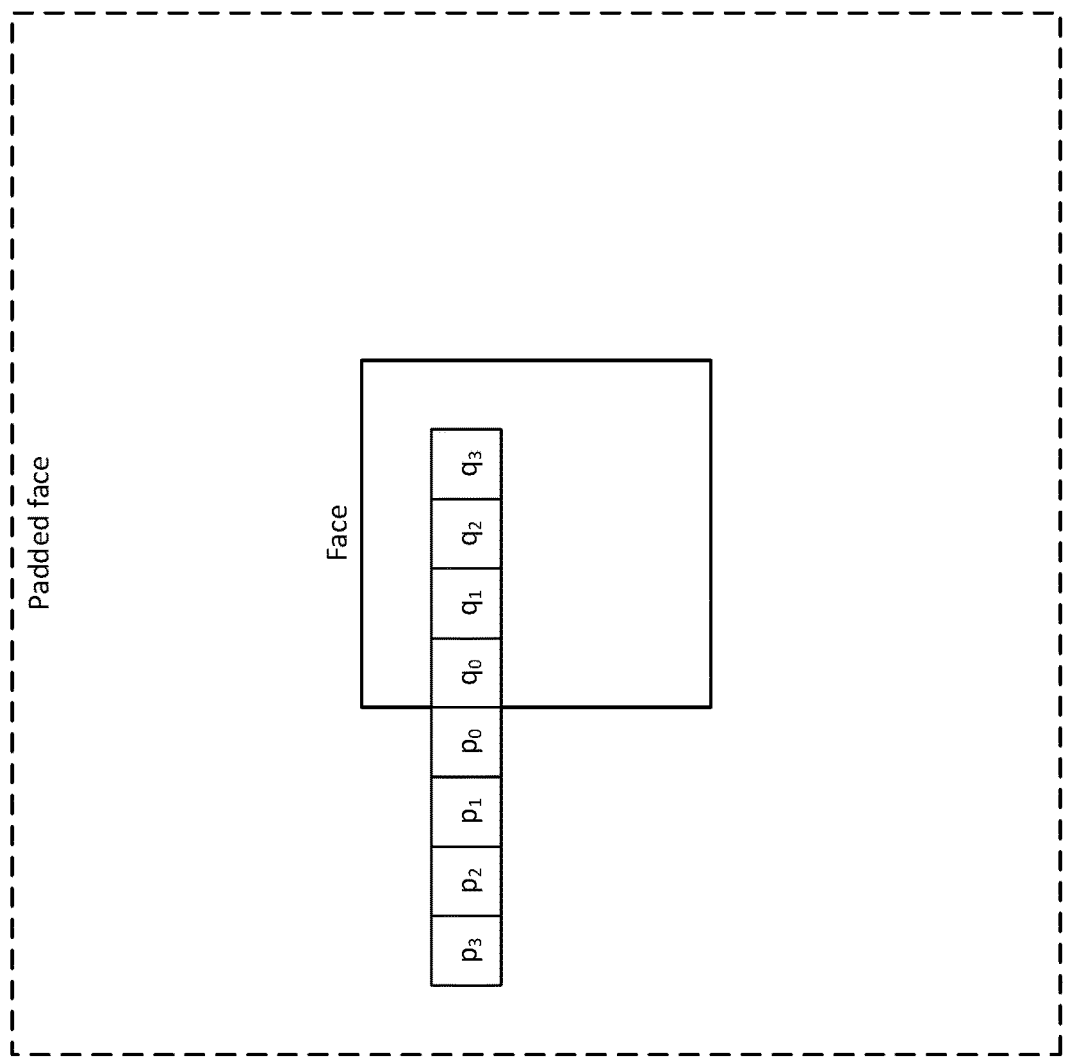
FIG. 15 is a diagram illustrating an example of face discontinuity filtering using geometry padded faces.

FIG. 15 shows an example of face discontinuity filtering using geometry-padding. One or more padded samples may be used in a filtering process where filtering may be applied at a sample position at which a padded sample may contribute to the filtering outcome. The one or more padded samples themselves may not be filtered (e.g. filtering at the padded sample positions may be skipped). Skipping filtering at these padded sample positions may save computational time (e.g. since the padded samples may eventually be discarded). As shown in FIG. 15, a face associated with a face discontinuity may be padded (e.g. with samples $p_0$, $p_1$, $p_2$, and $p_3$). The padded samples $p_0$, $p_1$, $p_2$, and $p_3$ may be used to filter samples $q_0$, $q_1$, $q_2$ and $q_3$ (e.g. which may be coded samples inside the face) while the padded samples $p_0$, $p_1$, $p_2$ and $p_3$ themselves may not be filtered. Nearest neighbor interpolation may be used together with geometry padding, e.g., to avoid certain pre-filtering operations that may be necessitated by interpolation and/or to reduce coding complexity.

In certain projection formats (e.g. hybrid cubemap or HCP), sampling may not be the same for every face. Parameters affecting (e.g. determining) the sampling operation may also be different between neighboring faces. For at least these projection formats, sphere padding may be used to fetch spherical neighbors located on a second side of a face discontinuity (e.g. outside a current frame boundary). Face-based padding may be less complex than geometry padding. Neighboring samples obtained by face-based padding, however, may not be correlated with the samples associated with the face discontinuity (e.g. samples associated with a boundary of the current face), and this may result in visible seam artifacts in the reconstructed video. To reduce such seam artifacts, filtering may be applied to one or more portions of the face discontinuity (e.g. as opposed to the entire face discontinuity). For example, filtering may be applied where a location difference (e.g. the absolute location difference) between a first sample on one side of the face discontinuity and a corresponding second sample on the other side of the face discontinuity is below a threshold (e.g. the first and second samples may be continuous samples on the sphere).

Figure 16A:
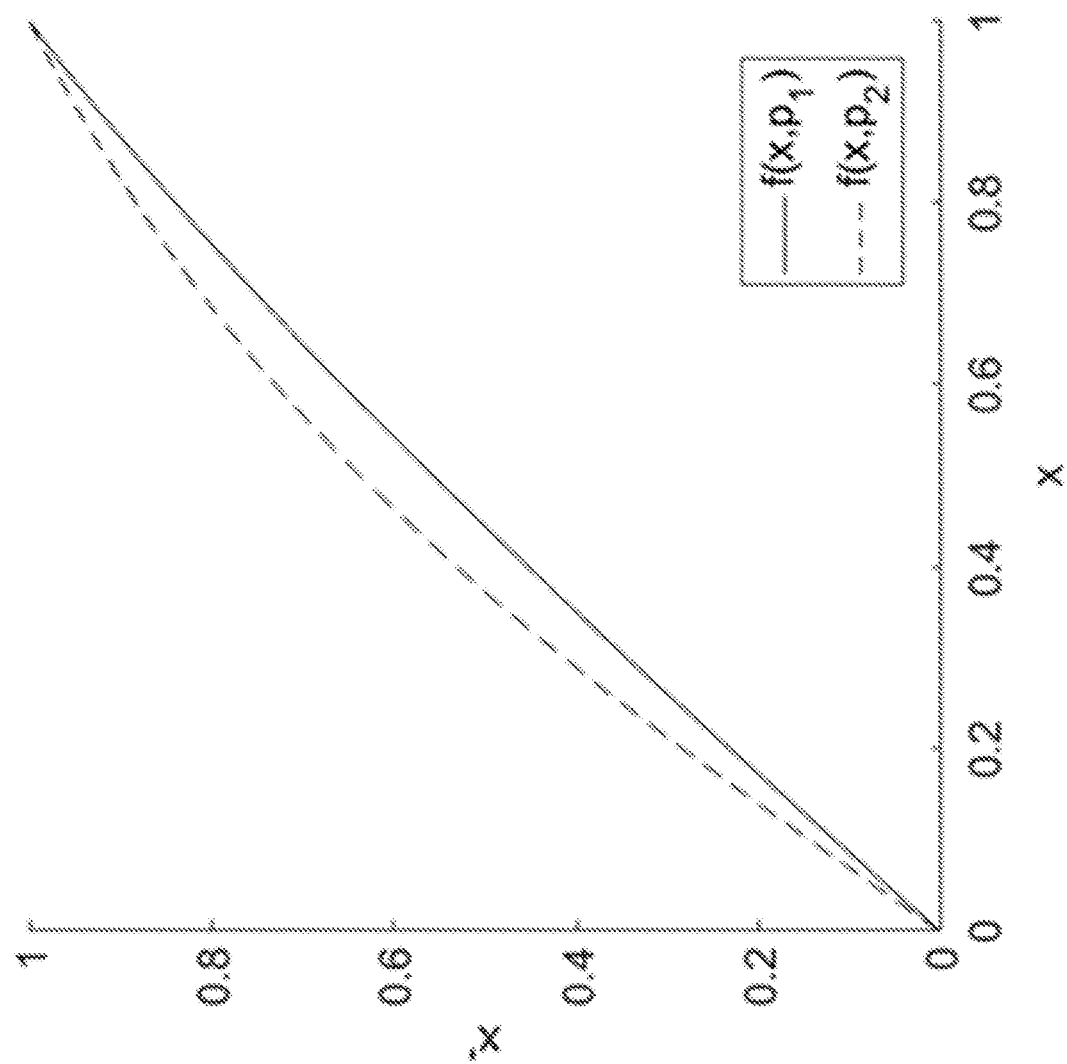
FIG. 16A is a graph illustrating an example of an adjustment function that may be computed for different parameter values.
Figure 16B:
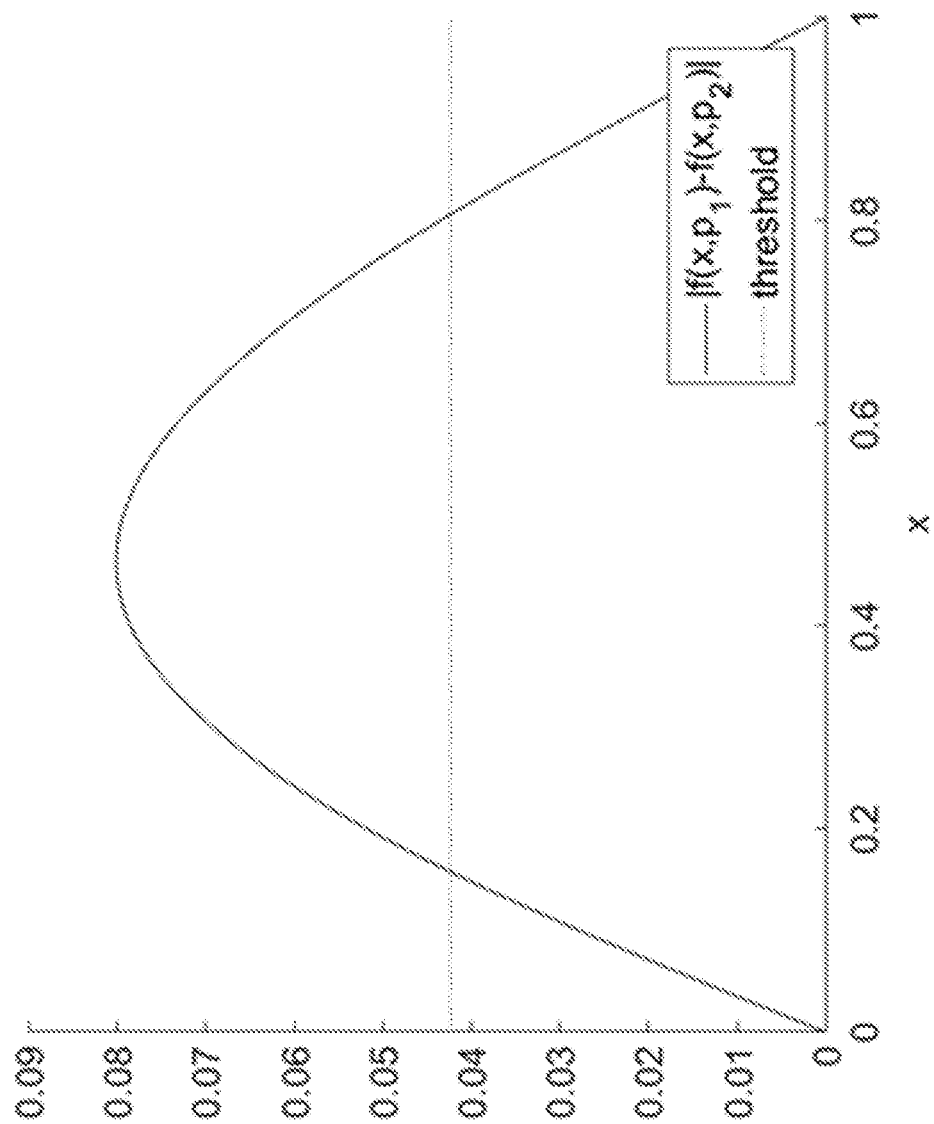
FIG. 16B is a graph illustrating an example of an absolute sample location difference for different parameter values.

FIG. 16A shows an example of calculating respective adjusted values x' for two different transform function parameters p1 and p2 using an adjustment function x'=f(x,p), where x may represent a position in a cube face, x' may represent a corresponding position in a HCP face, and p1 and p2 may be parameters that control the shape of the adjustment function. FIG. 16B is a diagram illustrating example absolute sample location differences corresponding to the different adjusted values x' calculated in FIG. 16A. As shown, the adjustment function x'=f(x,p) may be used to determine the respective sampling patterns of faces on both sides of a face boundary. Sample locations on both sides of the face boundary may be calculated/derived based on the adjustment function x'=f(x,p). A threshold value T may be defined, and the portions of the face boundary to be filtered may be determined by finding values of x that render the absolute difference between $f(x,p_1)$ and $f(x,p_2)$ equal to or less than T, as shown in Equation (6) and Equation (7) below:

$$|f(x,p_1)-f(x,p_2)|==T \quad (6)$$

$$|f(x,p_1)-f(x,p_2)|\leq T \quad (7)$$

Since the adjustment function f(x,p) may be monotonic, Equation (6) may be solved (e.g. iteratively) using techniques such as binary search. A same (e.g. substantially similar) process may be performed by the encoder and decoder, for example, when the projection format and parameters used by the encoder are signaled in a video bitstream to the decoder. Additionally or alternatively, the portion(s) (e.g., x) of the face to be filtered may be signaled (e.g. explicitly) in the video bitstream.

Motion compensated prediction may be performed with padded projection formats. Geometry padding may be utilized for this purpose. As described herein, a frame-packed picture may be padded at certain face boundaries (e.g., boundaries associated with a face discontinuity) to resolve seam artifacts in 360-degree video coding. The encoder may use different padding methods for different projection formats including octahedron projection (OHP), icosahedron projection (ISP), segmented sphere projection (SSP), and/or padded ERP (e.g. the PERP format described herein). Each projection format coded with padded samples may define (e.g. predefine) the locations of the padding regions. PERP may further define a blending method (e.g. which may be used only during post-processing and not during decoding). The padding method (e.g., by the encoder and/or decoder) may be based on the projection format used (e.g. a padding method may be unique to a specific projection format). A coding device (e.g., a decoder) may apply blending using reconstructed padded samples, for example, to enhance the reconstructed picture before rendering. If a blending method is not defined, the coding device may use the reconstructed padded samples for decoding and may discard the reconstructed padded samples when rendering the video content.

In examples (e.g. when a projection format is coded with padded samples), geometry padding may be performed to extend the reference picture(s) for motion compensated prediction. The coding device (e.g. an encoder and/or decoder) may handle the reconstructed padded samples in a reference picture first, before applying geometry padding for motion compensated prediction. The coding device may know the location of the padded samples, but the device may not know the method used to blend the padded samples. For example, the locations of the padded samples may be pre-defined or signaled for the coding device (e.g. the device may utilize these locations for 360-degree video rendering). If the device does not know the method used to blend the padded samples, the device may discard the padded samples before applying geometry padding. If the device knows the method used to blend the padded samples, the device may blend the reconstructed padded samples and apply geometry padding using the blended samples one or more boundaries, for example, to extend the reference picture for motion compensated prediction. The device may determine the method used to blend the padded samples through signaling in the bitstream (e.g. which may indicate the blending method), The device may apply a predefined blending method. The blending methods described herein may be used to extend one or more reference pictures during decoding, in addition to or in lieu of using blending during post-processing for content rendering purposes.

Figure 17A:
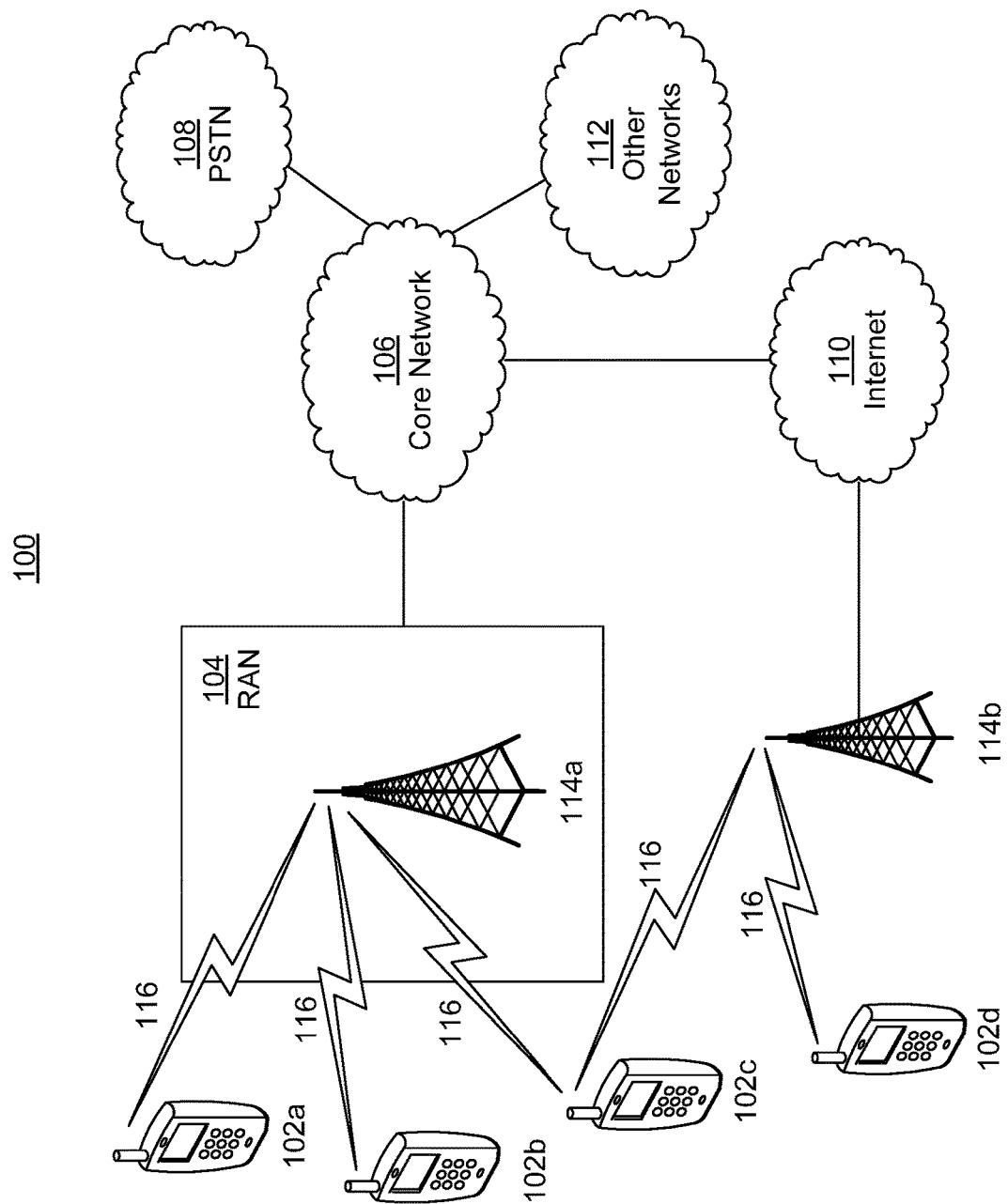
FIG. 17A is a system diagram illustrating an example communications system in which one or more disclosed embodiments may be implemented.

FIG. 17A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 17A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements, Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g. radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g. an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 17A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g. WCDMA, CDMA2000, GSM, LTE, LTE-A, LTE-A Pro, NR etc.) to establish a picocell or femtocell. As shown in FIG. 17A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 17A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown)

employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g. the WTRUs 102a, 102b, 102c, 102d may include multiple transceivers for communicating with different wireless networks over different wireless links). For example, the WTRU 102c shown in FIG. 17A may be configured to communicate with the base station 114a, which may employ a cellular-based radio technology, and with the base station 114b, which may employ an IEEE 802 radio technology.

Figure 17B:
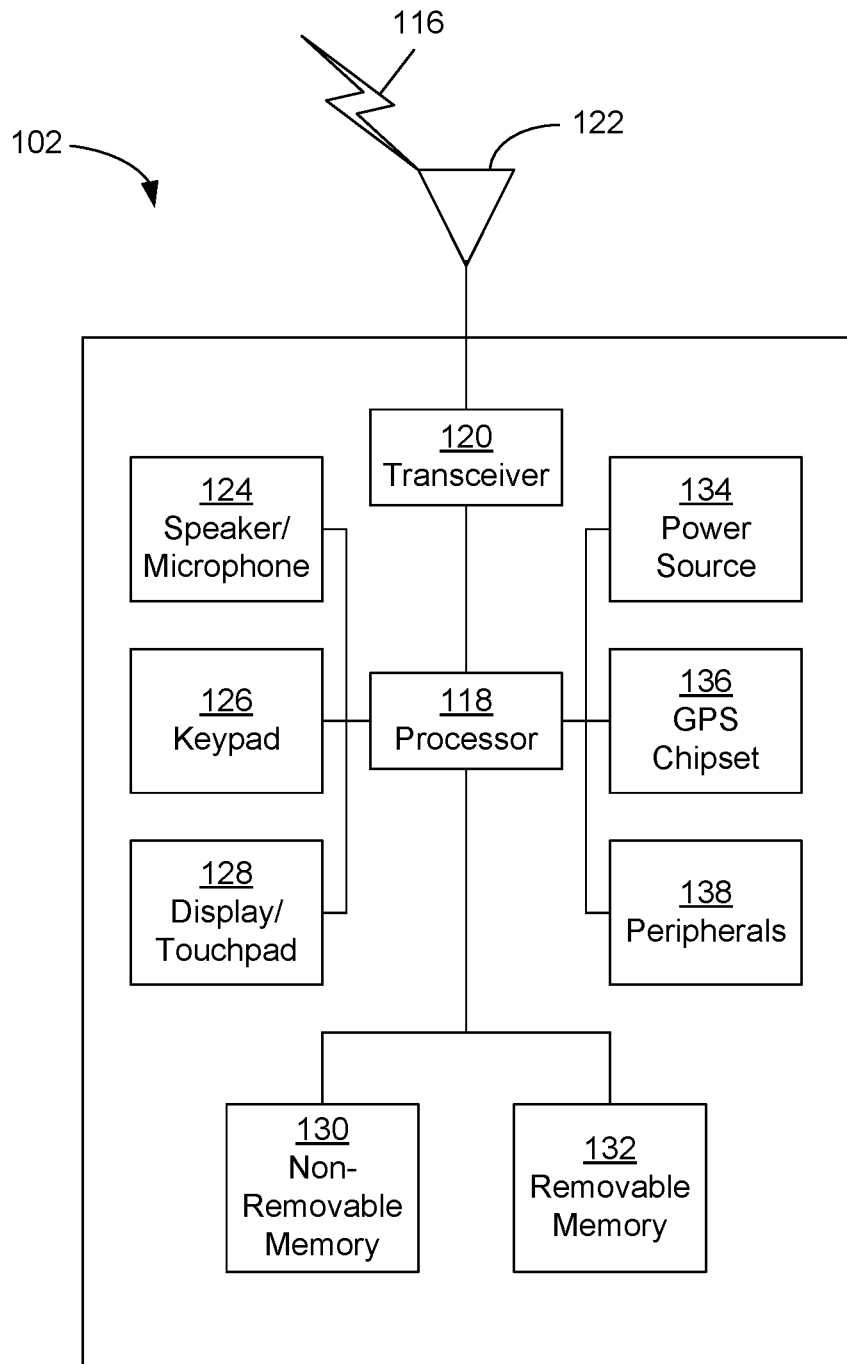
FIG. 17B is a system diagram illustrating an example wireless transmit/receive unit (WTRU) that may be used within the communications system illustrated in FIG. 17A according to an embodiment.

FIG. 17B is a system diagram illustrating an example WTRU 102. As shown in FIG. 17B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 17B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g. the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 17B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g. multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g. a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g. longitude and latitude) regarding the current location of the WTRU 102. In addition to, or in lieu of, the information from the GPS chipset 136, the WTRU 102 may receive location information over the air interface 116 from a base station (e.g. base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit to reduce and or substantially eliminate self-interference via either hardware (e.g. a choke) or signal processing via a processor (e.g. a separate processor (not shown) or via processor 118). In an embodiment, the WTRU 102 may include a half-duplex radio for which transmission and reception of some or all of the signals (e.g. associated with particular subframes for either the UL (e.g. for transmission) or the downlink (e.g. for reception)).

Figure 17C:
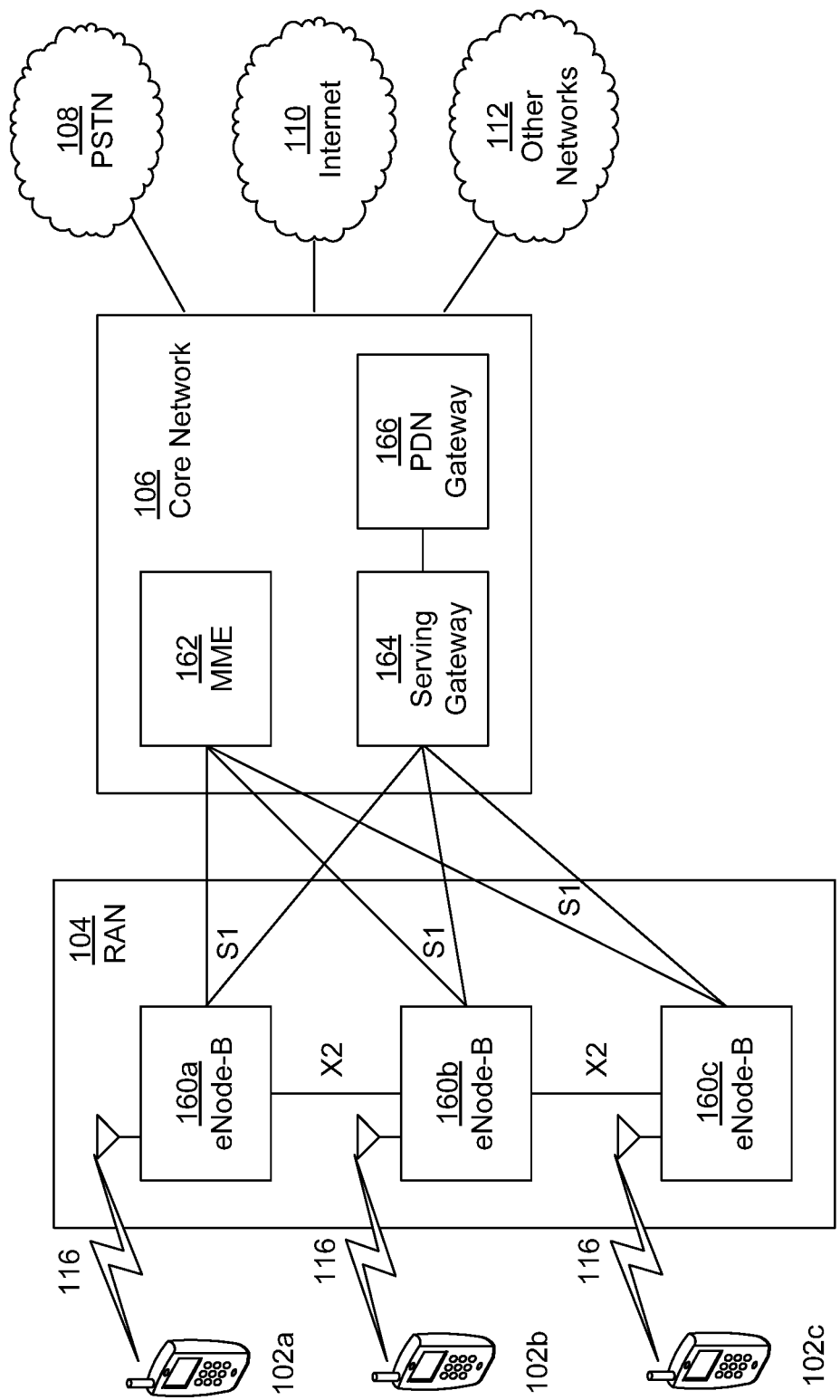
FIG. 17C is a system diagram illustrating an example radio access network (RAN) and an example core network (CN) that may be used within the communications system illustrated in FIG. 17A according to an embodiment.

FIG. 17C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 17C, the eNode-Bs 160*a*, 160*b*, 160*c* may communicate with one another over an X2 interface.

The CN 106 shown in FIG. 17C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g. an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 18A-18D as a wireless terminal, it is contemplated that in certain representative embodiments that such a terminal may use (e.g. temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, one or more STAs, including the AP, may sense the primary channel. If the primary channel is sensed/detected and/or determined to be busy by a particular STA, the particular STA may back off. One STA may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for certain and/or limited bandwidths. The MTC devices may include a battery with a battery life above a threshold (e.g. to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 17D:
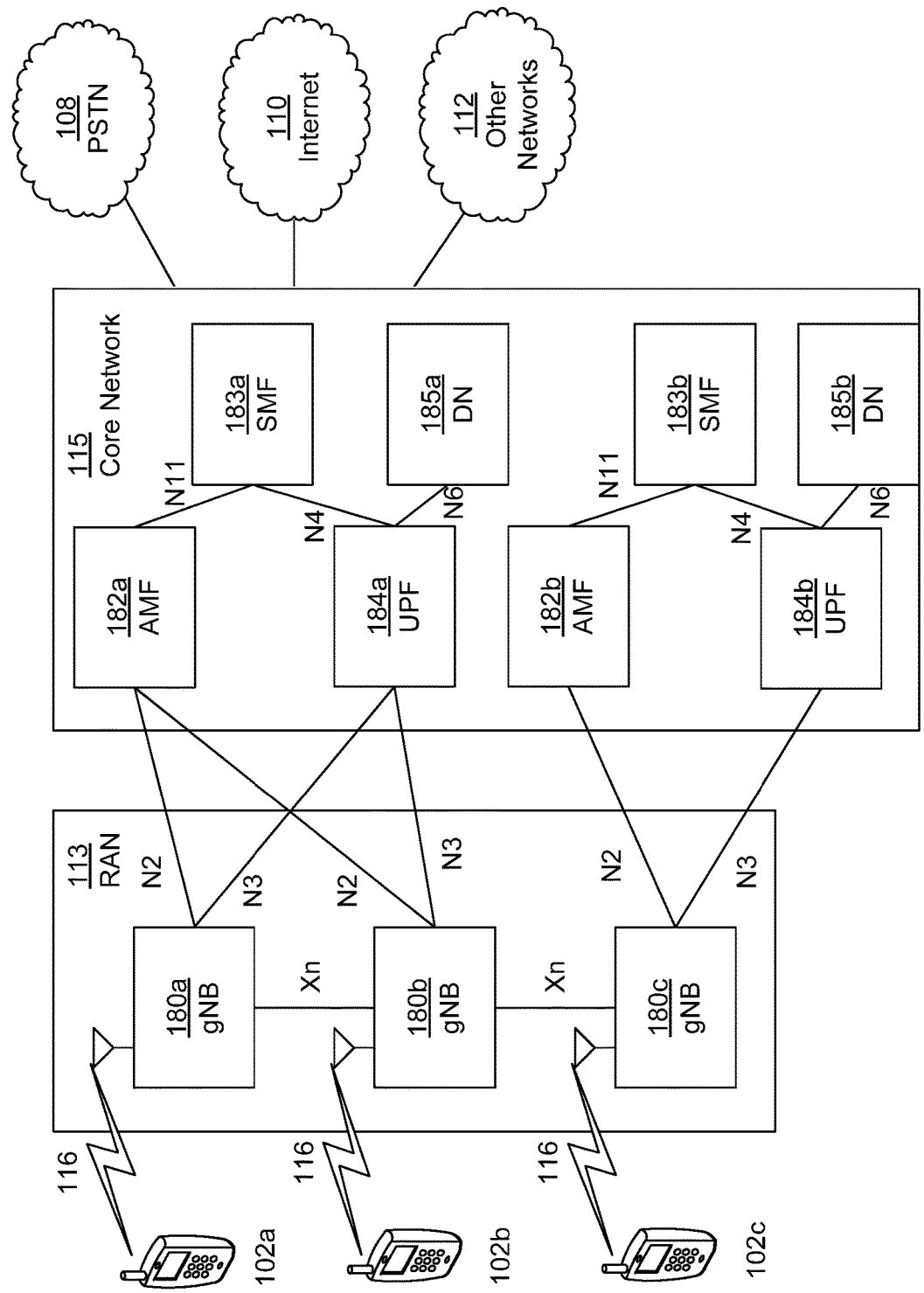
FIG. 17D is a system diagram illustrating a further example RAN and a further example CN that may be used within the communications system illustrated in FIG. 17A according to an embodiment.

FIG. 17D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g. containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g. such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 17D, the gNBs 180a, 180b, 180c may communicate with one another over an Xn interface.

The CN 115 shown in FIG. 17D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g. handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g. an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A video decoding device, comprising:
    a processor configured to:
        obtain a frame-packed picture from video data associated with a 360-degree video, wherein the frame-packed picture comprises one or more faces that correspond to respective two-dimensional (2D) projections of the 360-degree video onto a 2D plane;
determine whether a face discontinuity exists in the frame-packed picture; and
based at least on a determination that the face discontinuity exists in the frame-packed picture:
identify a first set of samples and a second set of samples that contribute to the face discontinuity, wherein the first set of samples is associated with a first face among the one or more faces, and wherein the second set of samples is associated with a second face among the one or more faces;
filter the first set of samples based on first padded samples associated with the first face; and
filter the second set of samples based on second padded samples associated with the second face;
wherein the first padded samples are located outside the boundaries of the first face and are derived based on sample locations inside the boundaries of the first face that bear a first geometrical relationship with the first padded samples, wherein the second padded samples are located outside the boundaries of the second face and are derived based on sample locations inside the boundaries of the second face that bear a second geometrical relationship with the second padded samples, and wherein the filtering of the first set of samples and the second set of samples removes one or more artifacts associated with the face discontinuity.

2. The video decoding device of claim 1, wherein the first geometrical relationship and the second geometrical relationship are defined based on a three-dimensional geometry associated with the 360-degree video.

3. The video decoding device of claim 2, wherein the first geometrical relationship and the second geometrical relationship are defined with respect to a center of a sphere associated with the 360-degree video.

4. The video decoding device of claim 1, wherein the filtering applied to the first set of samples has a same strength as the filtering applied to the second set of samples.

5. The video decoding device of claim 1, wherein the processor is configured to filter of the first set of samples and the second set of samples further based on an indication included in the video data that indicates that the filtering of the first set of samples and the second set of samples is to be performed.

6. The video decoding device of claim 1, wherein the processor being configured to identify the first set of samples and the second set of samples comprises the processor being configured to determine that the face discontinuity includes a first portion and a second portion, determine that only the first portion of the face discontinuity is to be filtered, and identify the first set of samples and the second set of samples based on a determination that the first set of samples and the second set of samples correspond to the first portion of the face discontinuity.

7. The video decoding device of claim 1, wherein the processor being configured to identify the first set of samples and the second set of samples comprises the processor being configured to obtain positional information associated with the face discontinuity from the video data, and determine a starting point of the face discontinuity and an end point of the face discontinuity based on the positional information.

8. The video decoding device of claim 7, wherein the positional information indicates respective coordinates of the starting point of the face discontinuity and the end point of the face discontinuity.

9. A method for decoding video data associated with a 360-degree video, the method comprising:
obtaining a frame-packed picture from the video data, wherein the frame-packed picture comprises one or more faces that correspond to respective two-dimensional (2D) projections of the 360-degree video onto a 2D plane;
determining whether a face discontinuity exists in the frame-packed picture; and
based at least on a determination that the face discontinuity exists in the frame-packed picture:
identifying a first set of samples and a second set of samples that contribute to the face discontinuity, wherein the first set of samples is associated with a first face among the one or more faces, and wherein the second set of samples is associated with a second face among the one or more faces;
filtering the first set of samples based on first padded samples associated with the first face; and
filtering the second set of samples based on second padded samples associated with the second face;
wherein the first padded samples are located outside the boundaries of the first face and are derived based on sample locations inside the boundaries of the first face that bear a first geometrical relationship with the first padded samples, wherein the second padded samples are located outside the boundaries of the second face and are derived based on sample locations inside the boundaries of the second face that bear a second geometrical relationship with the second padded samples, and wherein the filtering of the first set of samples and the second set of samples removes one or more artifacts associated with the face discontinuity.

10. The method of claim 9, wherein the first geometrical relationship and the second geometrical relationship are defined based on a three-dimensional geometry associated with the 360-degree video.

11. The method of claim 10, wherein the first geometrical relationship and the second geometrical relationship are defined with respect to a center of a sphere associated with the 360-degree video.

12. The method of claim 9, wherein the filtering applied to the first set of samples has a same strength as the filtering applied to the second set of samples.

13. The method of claim 9, wherein the filtering of the first set of samples and the filtering of the second set of samples are performed further based on an indication included in the video data that indicates that the filtering of the first set of samples and the filtering of the second set of samples are to be performed.

14. The method of claim 9, wherein identifying the first set of samples and the second set of samples comprises determining that the face discontinuity includes a first portion and a second portion, determining that only the first portion of the face discontinuity is to be filtered, and identifying the first set of samples and the second set of samples based on a determination that the first set of samples and the second set of samples correspond to the first portion of the face discontinuity.

15. The method of claim 9, wherein identifying the first set of samples and the second set of samples comprises obtaining positional information associated with the face discontinuity from the video data, and determining a starting point of the face discontinuity and an end point of the face discontinuity based on the positional information, and wherein the positional information indicates respective coordinates of the starting point of the face discontinuity and the end point of the face discontinuity.

16. A video encoding device, comprising:
a processor configured to:
determine a frame-packed picture associated with a 360-degree video, wherein the frame-packed picture comprises one or more faces that correspond to respective two-dimensional (2D) projections of the 360-degree video onto a 2D plane;
determine whether a face discontinuity exists in the frame-packed picture; and
based on a determination that the face discontinuity exists in the frame-packed picture:
identify a first set of samples and a second set of samples that contribute to the face discontinuity, wherein the first set of samples is associated with a first face among the one or more faces, and wherein the second set of samples is associated with a second face among the one or more faces;
filter the first set of samples based on first padded samples associated with the first face; and
filter the second set of samples based on second padded samples associated with the second face;
wherein the first padded samples are located outside the boundaries of the first face and are derived based on sample locations inside the boundaries of the first face that bear a first geometrical relationship with the first padded samples, wherein the second padded samples are located outside the boundaries of the second face and are derived based on sample locations inside the boundaries of the second face that bear a second geometrical relationship with the second padded samples, and wherein the filtering of the first set of samples and the second set of samples removes one or more artifacts associated with the face discontinuity.

* * * * *